(12) United States Patent
Hirabayashi et al.

(10) Patent No.: US 9,865,304 B2
(45) Date of Patent: Jan. 9, 2018

(54) FILE GENERATION DEVICE AND METHOD, AND CONTENT PLAYBACK DEVICE AND METHOD

(71) Applicant: SONY CORPORATION, Tokyo (JP)

(72) Inventors: Mitsuhiro Hirabayashi, Tokyo (JP); Shinobu Hattori, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/905,033

(22) PCT Filed: Jul. 10, 2014

(86) PCT No.: PCT/JP2014/068381
§ 371 (c)(1),
(2) Date: Jan. 14, 2016

(87) PCT Pub. No.: WO2015/008686
PCT Pub. Date: Jan. 22, 2015

(65) Prior Publication Data
US 2016/0163355 A1    Jun. 9, 2016

(30) Foreign Application Priority Data

Jul. 19, 2013  (JP) ................. 2013-151019
Mar. 20, 2014 (JP) ................. 2014-058950

(51) Int. Cl.
| | |
|---|---|
| *G11B 27/10* | (2006.01) |
| *H04N 21/235* | (2011.01) |
| *H04N 21/438* | (2011.01) |
| *G06F 17/30* | (2006.01) |
| *G11B 27/30* | (2006.01) |
| *G11B 20/10* | (2006.01) |

(52) U.S. Cl.
CPC ...... *G11B 27/102* (2013.01); *G06F 17/30091* (2013.01); *G06F 17/30115* (2013.01); *G06F 17/30858* (2013.01); *G11B 27/3027* (2013.01); *H04N 21/235* (2013.01); *H04N 21/438* (2013.01); *G11B 2020/10916* (2013.01)

(58) Field of Classification Search
CPC ............. G11B 27/102; G11B 27/3027; G06F 17/30091; G06F 17/30115; G06F 17/30858; H04N 21/235; H04N 21/438
USPC ........................................ 386/239, 241, 248
See application file for complete search history.

(56) References Cited

FOREIGN PATENT DOCUMENTS

WO    2014-006863    1/2014

OTHER PUBLICATIONS

WO 2014/170176, Denoual et al., Oct. 2014.*

(Continued)

*Primary Examiner* — Mishawn Hunter
(74) *Attorney, Agent, or Firm* — Chip Law Group

(57) ABSTRACT

The present disclosure relates to a file generation device and method, and a content playback device, enabling efficient access to arbitrary subsamples within a sample. Information for acquiring arbitrary subsamples (tiles) is disposed not by extending the sidx and the ssix, but by defining a separate box, a general subsegment index box (gsix), after the sidx and the ssix at the beginning of the segment file. The present disclosure may be applied to a content playback system equipped with a content server and a content playback device, for example.

20 Claims, 24 Drawing Sheets

(56) References Cited

OTHER PUBLICATIONS

Jean Le Feuvre, Cyril Concolato, Franck Denoual, Frédéric Mazé, Eeric Nassor, Nael Ouedraogo, Hervé Le Floch, "International Organisation for Standarisation Organisation Internationale De Normalisation ISO/IEC JTC1/SC29/WG11 Coding of Moving Pictures and Audio", Apr. 2013, Incheo (KR), Oct. 7, 2014.

"Information technology-Coding of audio-visual objects—Part 12: ISO base media file format, Technical Corrigendum 5", ISO/IEC JTC 1/SC 29, Dec. 12, 2011; ISO/IEC 14496-12:2008/Cor. 5:2011(E), Jul. 19, 2013.

* cited by examiner

FIG. 4

```
aligned(8) class GeneralSubsegmentIndexBox extends FullBox('gsix', 0, 0) {
    grouping_type int(32);
    unsigned int(32) subsegment_count;
    for (i=1; i <= subsegment_count; i++) {
        unsigned int(32) entry_count;
        for (j=1; j <= entry_count; j++) {
            unsigned int(8) entry_index;
            unsigned int(24) range_size;
        }
    }
}
```

FIG. 7

```
aligned(8) class TypeAssignmentBox extends FullBox('typa', 0, 0)
{
    unsigned int(8) entry_count;
    for (j=1; j <= entry_count; j++) {
        unsigned int(32) track_id;
        unsigned int(7) assignment_type;
        if (assignment_type == 0) {
            unsigned int(32) grouping_type;
        }
        else if (assignment_type == 1) {
            unsigned int(32) grouping_type;
            unsigned int(32) grouping_type_parameter;
        }
    }
    // other assignment_type values are reserved
}
```

☐ 0: sample groups are used to specify types
☐ 1: a parameterized sample group;

FIG. 8

```
aligned(8) class SubsampleBoxLocationBox extends FullBox( 'ssbl' , 0, 0)
{
    unsigned int(8) entry_count;
    for (i=1; i <= entry_count; i++) {
        unsigned int(32) box_type;
        for (j=1; j <= subsegment_count; j++) {
            unsigned int(32) box_offset;
            unsigned int(32) box_size;
        }
    }
}
```

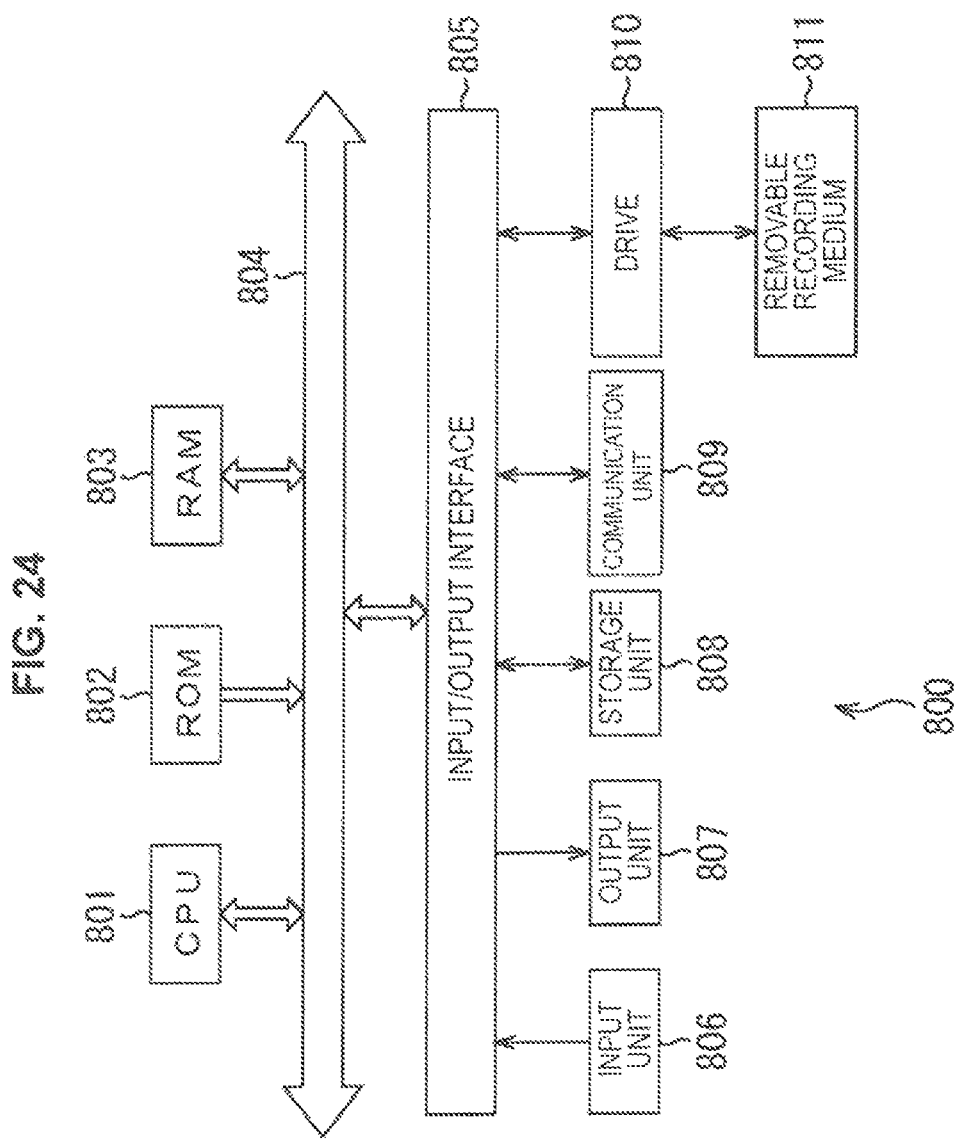

FILE GENERATION DEVICE AND METHOD, AND CONTENT PLAYBACK DEVICE AND METHOD

TECHNICAL FIELD

The present disclosure relates to a file generation device and method, and a content playback device and method, and more particularly, to a file generation device and method, and a content playback device and method, enabling efficient access according to data type within a segment.

BACKGROUND ART

International standardization of the next-generation video delivery technology MPEG Dynamic Adaptive Streaming over HTTP (MPEG-DASH) was confirmed in December 2011. MPEG-DASH is an adaptive streaming technology that uses the same HyperText Transfer Protocol (HTTP) as websites for the communication protocol of video delivery.

In MPEG-DASH, information for acquiring a segment of arbitrary time is stated in the MPD. In order to acquire data of arbitrary time within a segment file, access information of a subsegment within the segment is stated in the sidx at the beginning of the segment file. Furthermore, in order to acquire only arbitrary I/P pictures for the purpose of trick play and the like, information about the dependence level of IPB pictures and their size information are stated in the ssix following the sidx at the beginning of the segment file.

The sidx and the ssix are general-purpose access information that do not require interpretation of the MP4 (moof) structure, and may also be utilized as access information for a stream such as an MPEG-2 TS (see Non-Patent Literature 1).

CITATION LIST

Non-Patent Literature

Non-Patent Literature 1: MPEG-DASH (Dynamic Adaptive Streaming over HTTP) (URL: http://mpeg.chiariglione.org/standards/mpeg-dash/media-presentation-description-and-segment-formats/text-isoiec-23009-12012-dam-1)

SUMMARY OF INVENTION

Technical Problem

However, in HEVC, a tiled structure is used, which enables an application to decode only a region requiring decoding. However, if MPEG-DASH is made to support a tiled structure, the tiles are treated as subsamples, and in the ssix discussed above, only I/B/P access information in units of pictures may be stated.

Consequently, accessing an arbitrary tile within a picture requires analyzing the subsample information in the moof and the like, which increases the amount of processing before the acquisition of the actual data, and is not efficient at data acquisition.

The present disclosure has been devised in light of such circumstances, and enables efficient access to an arbitrary subsample within a sample.

Solution to Problem

A file generation device according to a first aspect of the present disclosure includes: a file generation unit configured to dispose, at a beginning of a file including a bit stream generated by encoding content in which an image is divided into a plurality of subsamples, subsample access information for acquiring arbitrary subsamples from among the plurality of subsamples, and thereby generate the file.

The subsample access information may be disposed after a segment index box and a subsegment index box at the beginning of the file.

The subsample access information may be index information and size information for all subsamples.

The subsample access information may be disposed in a general subsegment index box.

The subsample access information may be offset information to a box storing information related to subsamples in a moof, and size information for the box.

The subsample access information may be disposed in a SubsampleBox LocationBox.

The subsamples may be tiles.

An encoding unit that encodes the content in which an image is divided into a plurality of subsamples, and thereby generates the bit stream may be further included.

A file generation method according to the first aspect of the present disclosure includes: disposing, by a file generation device, at a beginning of a file including a bit stream generated by encoding content obtained by dividing an image into a plurality of subsamples, subsample access information for acquiring arbitrary subsamples from among the plurality of subsamples, and thereby generating the file.

A content playback device according to a second aspect of the present disclosure includes: an access information acquisition unit configured to acquire subsample access information from a file generated by disposing the subsample access information at a beginning of a file including a bit stream generated by decoding content in which an image is divided into a plurality of subsamples, the subsample access information being information for acquiring arbitrary subsamples from among the plurality of subsamples; a sample acquisition unit configured to acquire the arbitrary subsamples using subsample access information acquired by the access information acquisition unit; and a playback unit configured to play back arbitrary subsamples acquired by the sample acquisition unit.

The subsample access information may be disposed after a segment index box and a subsegment index box at the beginning of the file.

The subsample access information may be index information and size information for all subsamples.

The subsample access information may be disposed in a general subsegment index box.

The subsample access information may be offset information to a box storing information related to subsamples in a moof, and size information for the box.

The subsample access information may be disposed in a SubsampleBox LocationBox.

The subsamples may be tiles.

The content may be stored on a server connected via a network.

A content playback method according to the second aspect of the present disclosure includes: by a content playback device, acquiring subsample access information from a file generated by disposing the subsample access information at a beginning of a file including a bit stream generated by decoding content in which an image is divided into a plurality of subsamples, the subsample access information being information for acquiring arbitrary subsamples from among the plurality of subsamples; acquiring the arbitrary subsamples using acquired subsample access information; and playing back arbitrary acquired subsamples.

In the first aspect of the present disclosure, at a beginning of a file including a bit stream generated by encoding content in which an image is divided into a plurality of subsamples, subsample access information for acquiring arbitrary subsamples is disposed from among the plurality of subsamples, and thereby the file is generated.

In the second aspect of the present disclosure, subsample access information is acquired from a file generated by disposing the subsample access information at a beginning of a file including a bit stream generated by decoding content in which an image is divided into a plurality of subsamples, the subsample access information being information for acquiring arbitrary subsamples from among the plurality of subsamples. Using acquired subsample access information, arbitrary acquired subsamples are played back.

Note that the above file generation device and content playback device each may be an independent device, or an internal block constituting part of a single device.

Advantageous Effects of Invention

According to a first aspect of the present disclosure, a file may be generated. Particularly, access according to data type within a segment may be conducted efficiently.

According to a second aspect of the present disclosure, content may be played back. Particularly, access according to data type within a segment may be conducted efficiently.

Note that the advantageous effects described in this specification are merely for the sake of example. The advantageous effects of the present technology are not limited to the advantageous effects described in this specification, and there may be additional advantageous effects.

BRIEF DESCRIPTION OF DRAWINGS

FIG. 4 is a diagram illustrating an example of general subsegment index box (gsix) syntax.
FIG. 7 is a diagram illustrating an example of type assignment box syntax.
FIG. 8 is a diagram illustrating an example of SubsampleBox LocationBox syntax.

FIG. 24 is a block diagram illustrating an exemplary configuration of a computer.

DESCRIPTION OF EMBODIMENTS

Hereinafter, embodiments for carrying out the present disclosure (hereinafter designated embodiments) will be described. Hereinafter, the description will proceed in the following order.
0. Overview
1. First Embodiment (content playback system)
2. Second Embodiment (computer)
   <0. Overview>
[Overview]

In MPEG-DASH, information for acquiring a segment of arbitrary time is stated in the Media Presentation Description (MPD). Also, in order to acquire data of arbitrary time within a segment file, access information of a subsegment within the segment is stated in the segment index box (sidx) at the beginning of the segment file. Furthermore, in order to acquire only arbitrary I/P pictures for the purpose of trick play and the like, information about the dependence levels (levels) of IPB pictures and their size information are stated in the subsegment index box (ssix) following the sidx at the beginning of the segment file.

The sidx and the ssix are general-purpose access information that do not require interpretation of the MP4 (moof) structure, and may also be utilized as access information for a stream such as an MPEG-2 TS.
[Exemplary Configuration of MP4 File Conforming to MPEG-DASH]

Figure 1:
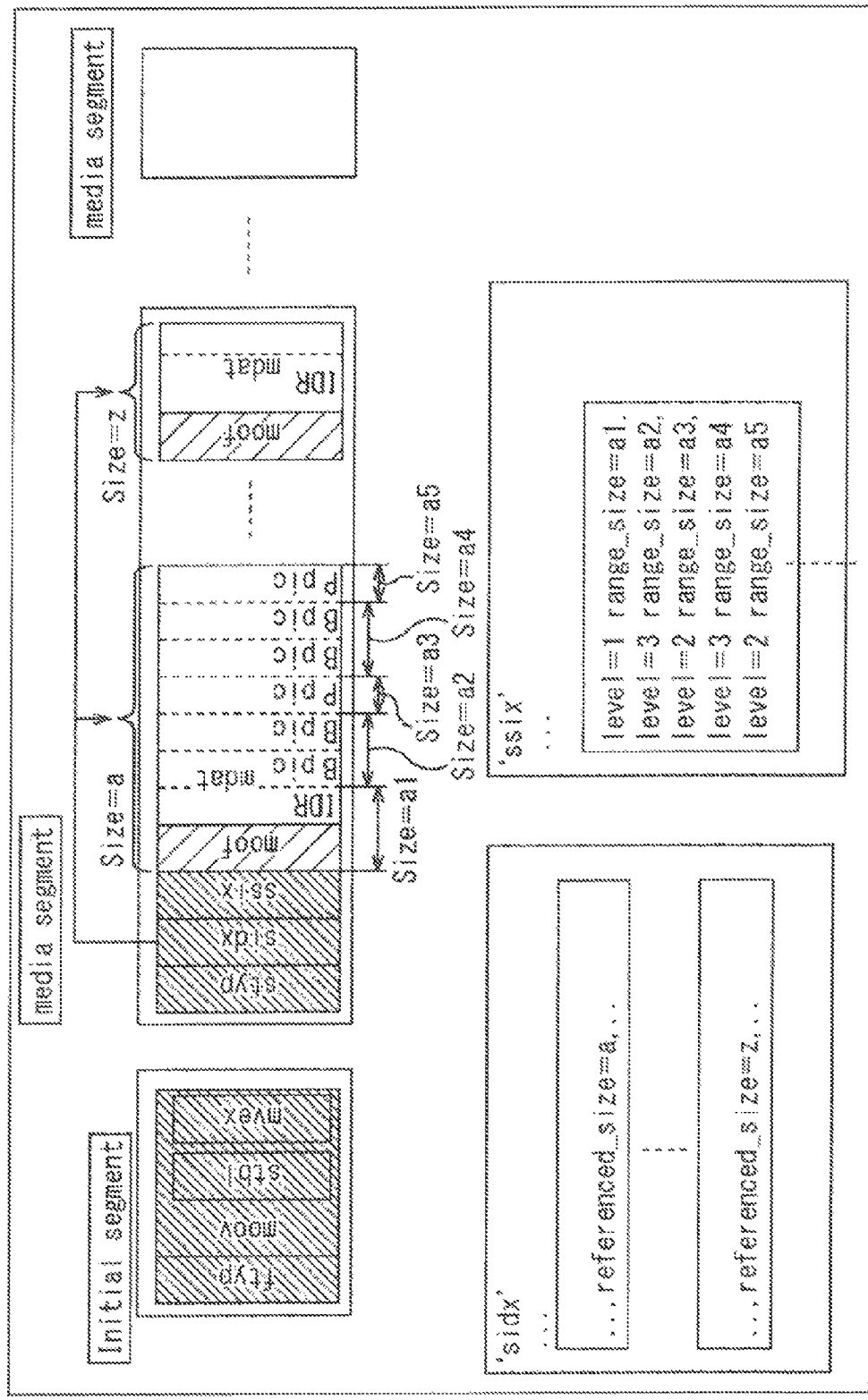
FIG. 1 is a diagram illustrating an exemplary configuration of an MP4 file conforming to MPEG-DASH.

FIG. 1 is a diagram illustrating an exemplary configuration of an MP4 file conforming to MPEG-DASH, including the sidx and the ssix.

In the example of FIG. 1, the MP4 file conforming to MPEG-DASH is made up of an initial segment file in which coding initialization information is stored, and multiple media segment files in which samples are stored.

The initial segment file is made up of an ftyp, and a moov including a sample table box (stbl) and an mvex.

A media segment (hereinafter also simply called a segment) file includes multiple moofs and mdats in which pictures are stored. Before the beginning of the moof, or in other words, at the beginning of the segment file, the styp, sidx, and ssix are disposed. Herein, the multiple moofs and mdat included in a segment file will be called subsegments.

In the sidx and the ssix, access information for accessing the subsegments constituting the segment file acquired from MPD information (time, URL) are stored.

In the sidx, as illustrated in the bottom-left of the drawing, a table of the size (referenced_size) of the subsegments (moof+mdat) is stored. Consequently, from the sidx information, it is possible to acquire only the subsegment of an arbitrary time, or in other words, random access is possible.

Also, as illustrated in the bottom-right of the drawing, in the ssix, a table of the level (coding level) and size (range_size) of the video (pictures) constituting a subsegment is stored. Note that the moof is included in the size of the IDR at the beginning. Also, the sizes of successive B pictures are managed collectively. Note that the level indicates the dependence level.

Consequently, from the ssix information, it is possible to acquire only the data of a subsegment of arbitrary time or an arbitrary level of video.

[Mechanism of Level Assignment]

Figure 2:
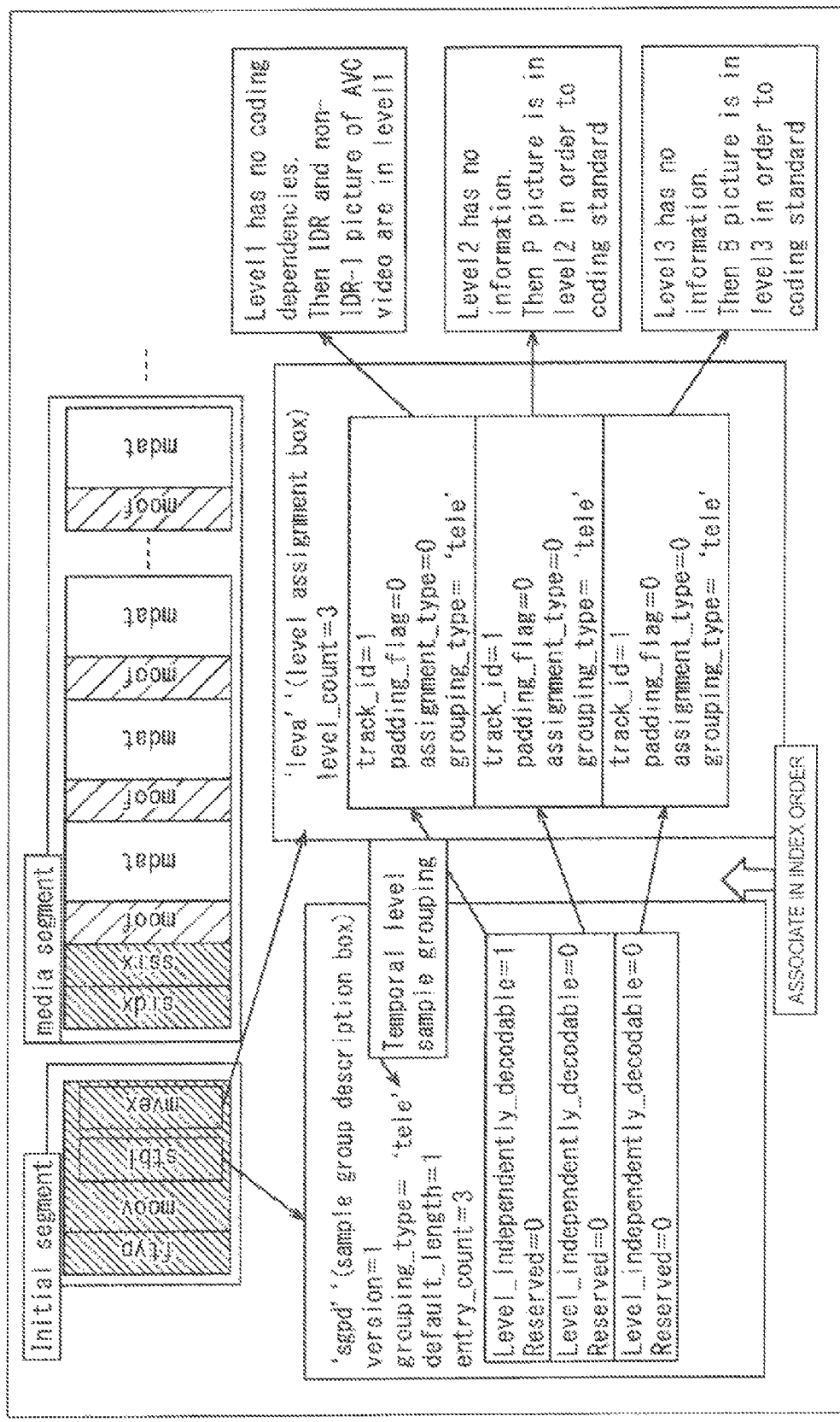
FIG. 2 is a diagram explaining the mechanism of level assignment.

Next, the mechanism of deciding the level, which is one piece of information stored in the ssix, will be described with reference to FIG. 2.

As illustrated on the left side of the drawing, in the sample group description box (sgpd) of the stbl in the initial segment file, the meaning of a level is defined by defining a 'tele' sample group. The tele, which is a grouping_type in the sgpd, indicates a temporal level sample grouping, and expresses the use of the temporal level sample grouping mechanism.

In the tele, entry_count=3 indicates that three entries are stated, and a picture is defined as being an I picture or not by using only a Level_independently_docodable flag. For example, going in order from the top, Index 1 is entered as Level_independently_decodable=1 (no coding dependencies) and Reserved=0. Index 2 is entered as Level_independently_decodable=0 (coding dependencies) and Reserved=0. Index 3 is entered as Level_independently_decodable=0 (coding dependencies) and Reserved=0.

Also, as illustrated on the right side of the drawing, in the level assignment box (leva) of the mvex in the initial segment file, there are three level_counts, with each indicating which level to assign. In order from the top, the level_counts are Level 1 to Level 3, with each defining track_id=1, padding_flag=0, assignment_type=0, and grouping_type='tele'.

Additionally, the respective entries in the sgpd and the love are associated with each other in the index order. In other words, in order from the top, Level 1 is associated with Index 1 of the sgpd. Consequently, Level 1 has no coding dependencies, and IDR and non-IDR pictures of AVC video are interpreted as being Level 1.

Also, Level 2 is associated with Index 2 of the sgpd. Consequently, Level 2 has no information, and P pictures are interpreted as being Level 2 in the dependence hierarchy of the coding standard.

Level 3 is associated with Index 3 of the sgpd. Consequently, Level 3 has no information, and B pictures are interpreted as being Level 3 in the dependence hierarchy of the coding standard.

[Support for HEVC Tiled Structure]

At this point, in coding according to the HEVC standard, a tiled structure may be used to enable an application to decode only a region requiring decoding.

On the other hand, in MP4, the definition of a subsample is decided for each codec. For example, when one picture is made up of multiple tiles in HEVC, the tiles are managed as subsamples constituting a sample in the MP4 file.

Additionally, in order to acquire only arbitrary subsamples (tiles) constituting a sample from the MP4 file, a process of first acquiring the moof, acquiring the subsample information box within the moof, and then acquiring the subsamples is necessary. In other words, there is a large amount of processing before acquiring the actual data, such as having to deliberately analyze the moof, and data acquisition is inefficient.

Meanwhile, in an MP4 file conforming to MPEG-DASH, as discussed earlier, the sidx and the ssix are general-purpose access information that do not require interpretation of the MP4 (moof) structure, and may also be utilized as access information for a stream such as an MPEG-2 TS.

However, since only I/B/P access information in units of pictures may be stated in the ssix, ultimately, interpretation of the MP4 (moof) structure is required, and thus the amount of processing in order to acquire the actual data is large.

Furthermore, when a segment is made up of multiple moofs/mdats, since the subsample information box is stored within each moof, the amount of processing in order to acquire the actual data becomes even larger.

Accordingly, the present technology provides an extended definition of a general subsegment index box (gsix) in which information for acquiring arbitrary subsamples (tiles) may be stored collectively at the beginning of the segment file. For example, the gsix stores subsample access information for accessing arbitrary subsamples and acquiring arbitrary subsamples.

Note that although the following describes an example in which the subsamples are tiles, the present technology is not limited to subsamples and tiles, and provides an extended definition of a general-purpose mechanism enabling the statement of some element constituting a sample.

[Exemplary Configuration of MP4 File Conforming to MPEG-DASH]

Figure 3:
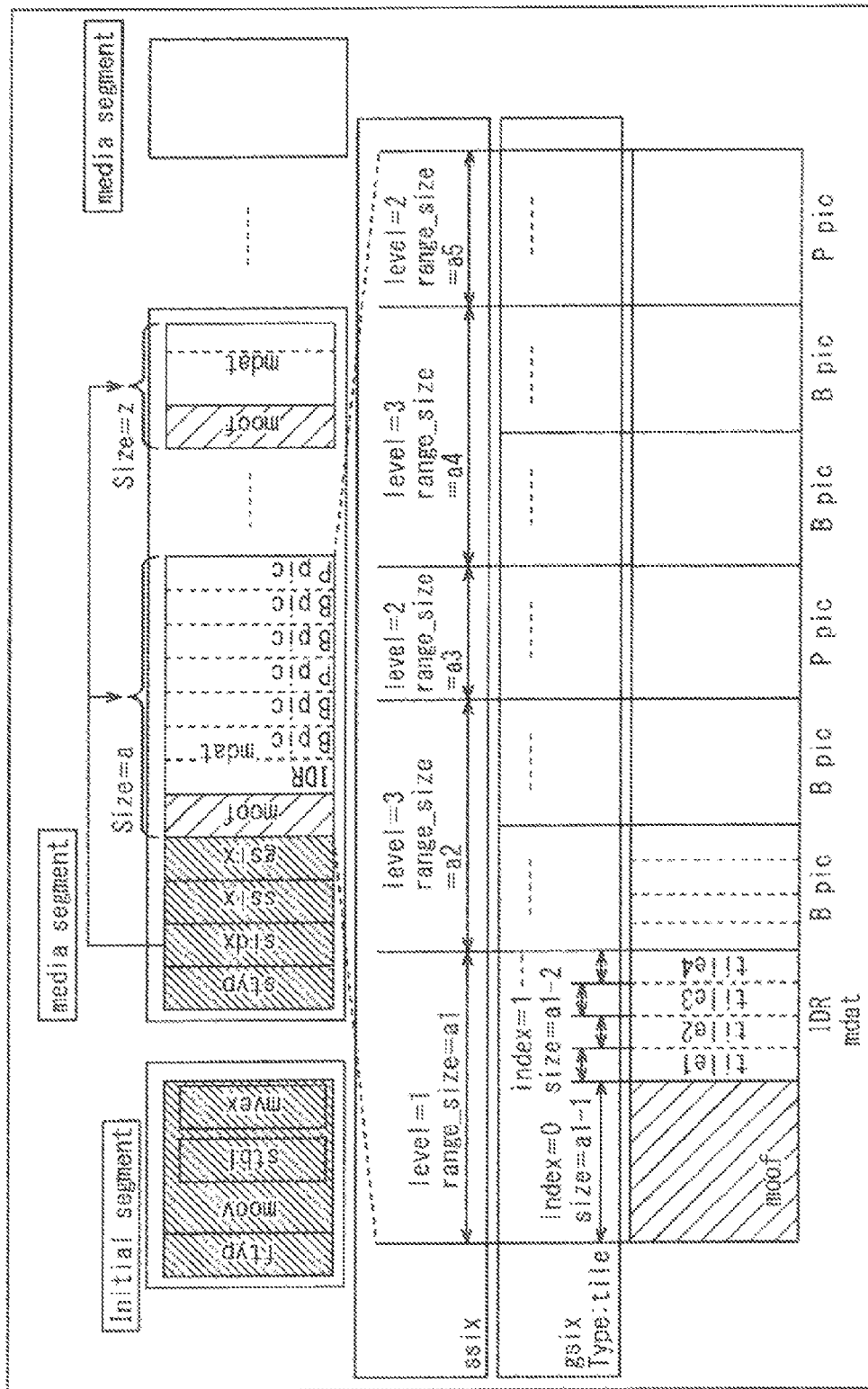
FIG. 3 is a diagram illustrating another exemplary configuration of an MP4 file conforming to MPEG-DASH.

FIG. 3 is a diagram illustrating an exemplary configuration of an MP4 file conforming to MPEG-DASH, including the sidx, the ssix, and the gsix.

The example of FIG. 3 illustrates an example in which each picture included in the mdat is made up of four tiles. Also, the example of FIG. 3 differs from the example of FIG. 1 only in that the gsix is additionally disposed after the styp, the sidx, and the ssix at the beginning of the media segment (hereinafter also simply called the segment) file.

In other words, similarly to the example of FIG. 1, in the ssix, from the beginning of the file, the moof and IDR are stated to be level=1 and range_size=a1. A Bpic is stated to be level=3 and range_size=a2. A Ppic is stated to be level=2 and range_size=a3. A Bpic is stated to be level=3 and range_size=a4. A Ppic is stated to be level=2 and range_size=a5.

On the other hand, unlike the example of FIG. 1, the gsix states all index information and size information (access information) for the moof and all tiles. In the gsix, from the beginning of the file, the moof is stated to be index=1 and size=a1-1. A tile1 is stated to be index=2 and size=a1-2. Although omitted from illustration in the drawing, similar statements are made thereafter.

By using the sidx, ssix, and gsix as above, a process of acquiring arbitrary tiles, such as acquiring only tile1 or acquiring only tile1 of I pictures, for example, may be conducted rapidly and efficiently.

[Example of Gsix Syntax]

FIG. 4 is a diagram illustrating an example of general subsegment index box (gsix) syntax. Note that the gsix is stored after the sidx/ssix in each segment file. Gsixes of multiple groupings and types exist. The range of gsix points to information for one or more samples, or information for one or more subsamples.

In the example of FIG. 4, grouping_type int(32) on the second line from the top defines the type of the sample group entry managed by the gsix.

On the eighth line from the top, entry_index is an index to the type assignment box (FIG. 5) for associating with tile position information. Index=0 indicates moof data. Note that, although discussed in detail later with reference to FIG. 5, it is also possible to point to an index to a visual sample group entry directly from the gsix, without using the type assignment box.

On the ninth line from the top, range_size indicates the byte range (size information) of the sample group entry information. By referencing range_size, it is possible to access an arbitrary tile (subsample).

[Sample Group Entry Mapping]

Next, sample group entry mapping will be described with reference to FIG. 5.

As illustrated on the left side of the drawing, in the sample group description box (sgpd) of the stbl in the initial segment file, a tile is defined by defining a 'tile' sample group.

In 'tile', entry_count=n indicates that n entries are stated. In the example of FIG. 5, are four VisualSampleGroupEntry entries respectively state the position information of four tiles.

Also, as illustrated on the right side of the drawing, in the type assignment box (typa) of mvex in the initial segment file, entry_count=n indicates that n entries are stated. In the example of FIG. 5, four entries defining Grouping_type="tile" are stated.

Additionally, the respective entries in the sgpd and the typa are associated with each other in the index order. Consequently, for example, entry_index in the gsix of FIG. 4 points to the index of the typa, and additionally points to the VisualSampleGroupEntry of the sgpd corresponding to that index, and thus the position information of a tile may be acquired.

Note that, as discussed earlier, when entry_index of the gsix in FIG. 4 is configured to point to the index of the sgpd directly, the typa box becomes unnecessary.

Additionally, the sgpd may also be configured to be stored not in the stbl but in the mvex, as indicated by the dashed line. The stbl is a box configured for each track. In contrast, one mvex is configured for the moov, and the mvex is a box declaring the use of a fragment structure. In other words, when composed of multiple tracks, the sgpd may also be stored in the mvex, thereby enabling the sgpd to be used in common among files.

[Example of Sample Group Entry Syntax]

Figure 5:
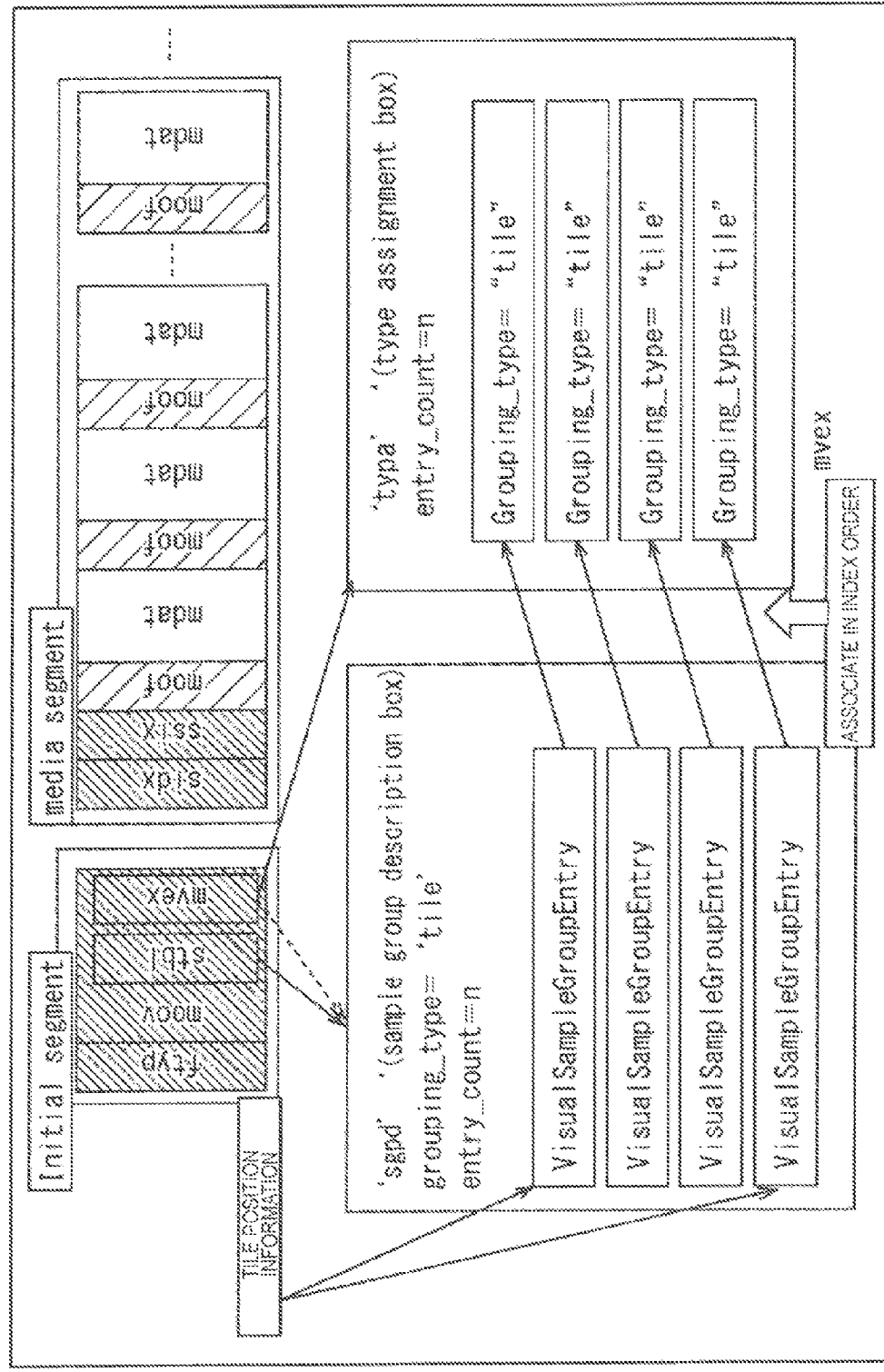
FIG. 5 is a diagram explaining sample group entry mapping.
Figure 6:
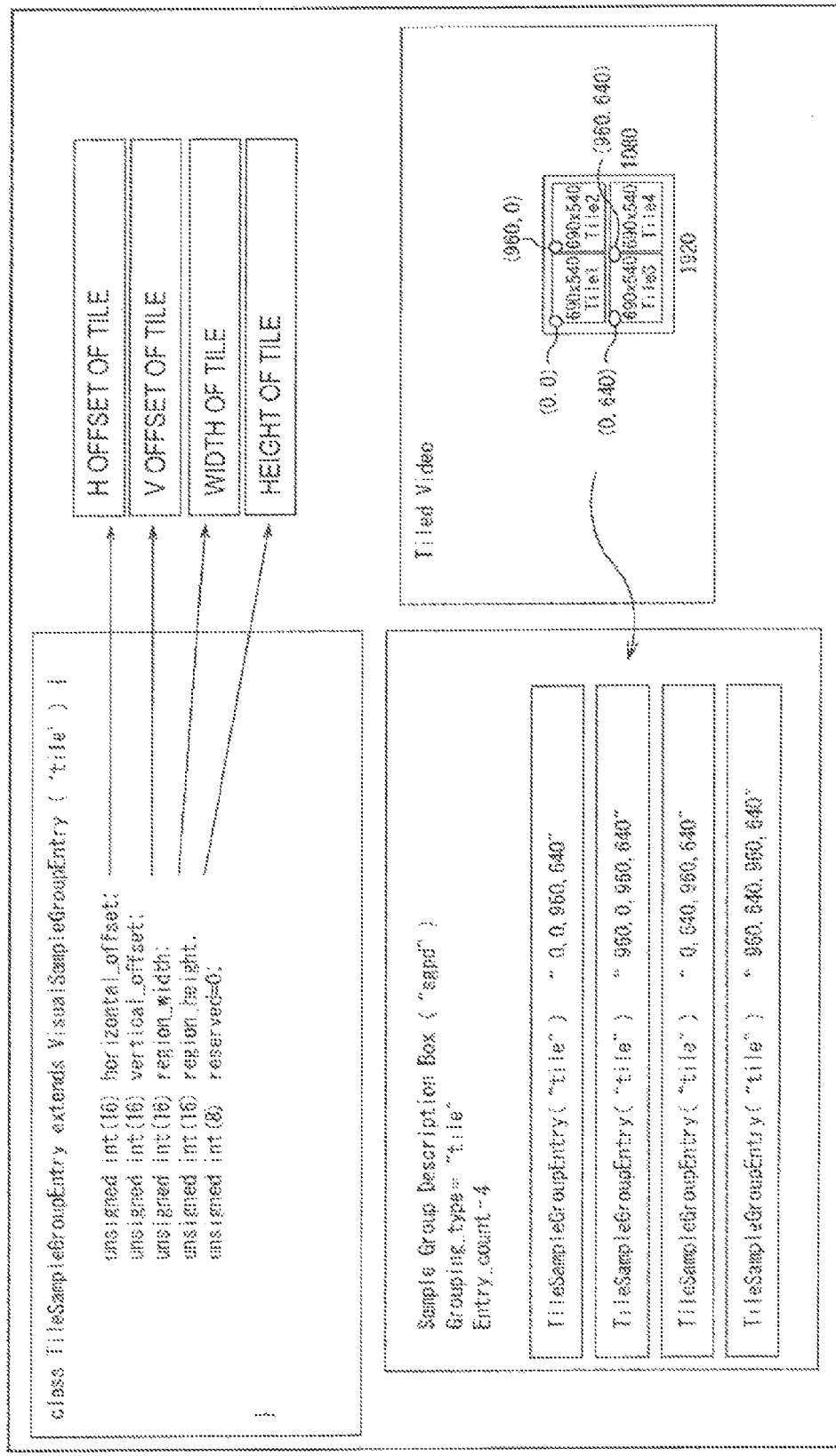
FIG. 6 is a diagram illustrating an example of sample group entry syntax.

FIG. 6 is a diagram illustrating a syntax example of sample group entries stating tile position information, and an example of a sample group description box defining the sampling group 'tile'. Note that the sample group description box in FIG. 5 is a generalization using VisualSampleGroupEntry. In actual practice, VisualSampleGroupBntry is extended like TileSampleGroupEntry illustrated in FIG. 6.

As illustrated by the syntax in FIG. 6, TileSampleGroupEntry, which is an extension of VisualSampleGroupEntry, stores a horizontal (H) offset of a tile, a vertical (V) offset of the tile, the width of the tile, and the height of the tile as tile position information.

For example, when a picture has a tiled structure (tiled video) as illustrated on the right side of the drawing, the 'tile' group entry defined by the sample group description box is configured to include four entries from Index 1 to 4.

In other words, in the 'tile' group entry, the tile position information "0,0,960,640" is entered as the TileSampleGroupEntry("tile") of Index 1. Also, the tile position information "960,0,960,640" is entered as the TileSampleGroupEntry("tile") of Index 2. Also, the tile position information "0,640,960,640" is entered as the TleSampleGroupEntry ("tile") of Index 3. Additionally, the tile position information "960,640,960,640" is entered as the TldeSampleGroupEntry ("tile") of Index 4.

Consequently, tile position information may be acquired by indicating the index number of the tile.

[Example of Type Assignment Box Syntax]

FIG. 7 is a diagram illustrating a syntax example of the type assignment box syntax in FIG. 5. In the type assignment box illustrated in FIG. 7, grouping_type="tile" illustrated in FIG. 5 is defined.

Note that the above describes an example of the case in which the HEVC tiles are composed of a single track. In contrast, in the case in which the HEVC tiles are composed of multiple tracks like in the following, subsamples may be stored collectively in a contiguous area.

For example, Moof-Tile1(I)/Tile1(B)/Tile1(B)/Tile1(P)/Tile1(B)/Tile1(B)/Tile1(P) Moof-Tile2(I)/Tile2(B)Tile2(B)/Tile2(P)/Tile2(B)/Tile2(B)/Tile2(P)

Even when configured in this way, by disposing the gsix, transmission efficiency may be improved further over the case of acquiring tiles from ordinary samples (tile1/2 . . . ).

Note that although the foregoing describes an example of disposing the gsix after the sidx and the ssix at the beginning of the segment file, the example of subsample access information for accessing arbitrary subsamples and acquiring arbitrary subsamples is not limited to information stored in the gsix. As another example of subsample access information for accessing arbitrary subsamples and acquiring arbitrary subsamples, for example, only access information to a box storing a method for accessing arbitrary subsamples within the moof may be disposed after the sidx and the ssix at the beginning of the segment file.

[Other Examples of Subsample Access Information]

FIG. 8 is a diagram illustrating an example of SubsampleBox LocationBox syntax.

The SubsampleBox LocationBox illustrated by the example of FIG. 8 is a box disposed after the sidx and the ssix at the beginning of the segment file as discussed above, and is a box storing access information to a box within the moof storing a method for accessing arbitrary subsamples.

In box_type on the fifth line from the top, the type of box storing the method for accessing arbitrary subsamples is stated as a 4-character code (4CC). Examples of such a box include a subsample information box ('subs'), a subsample hint information box ('sshi'), and the like.

The subsample information box is a box storing information such as information about the subsamples constituting the sample, for example. The subsample hint information box is a box storing information such as information that groups multiple subsamples together, and information required to decode a grouped subsample group. Both boxes are disposed within the moof.

In addition, the seventh and eighth lines from the top state the offset from the SubsampleBox LocationBox to the start position of the box stated by box_type on the fifth line, and the size information for that box, respectively.

In this way, access information to a box storing a method for accessing arbitrary subsamples within the moof is disposed at the beginning of the segment file, and thus a process of interpreting information within the moof may be omitted. Consequently, arbitrary subsamples within a sample may be accessed efficiently.

As above, in the present technology, information for acquiring arbitrary subsamples (tiles) is disposed at the beginning of the segment file, thereby enabling efficient access to arbitrary subsamples within a sample. Consequently, efficient data acquisition over HTTP may be realized.

Also, information for acquiring arbitrary subsamples (tiles) is disposed not by extending the sidx and the ssix, but by defining a separate box following the sidx and the ssix at the beginning of the segment file. Consequently, extension that does not affect existing equipment may be performed.

Furthermore, even for information other than tiles, access according to data type within a segment may be realized.

Next, an example of a content playback system applying the above technology will be described hereinafter.

<1. First Embodiment>
[Information Processing System]

Figure 9:
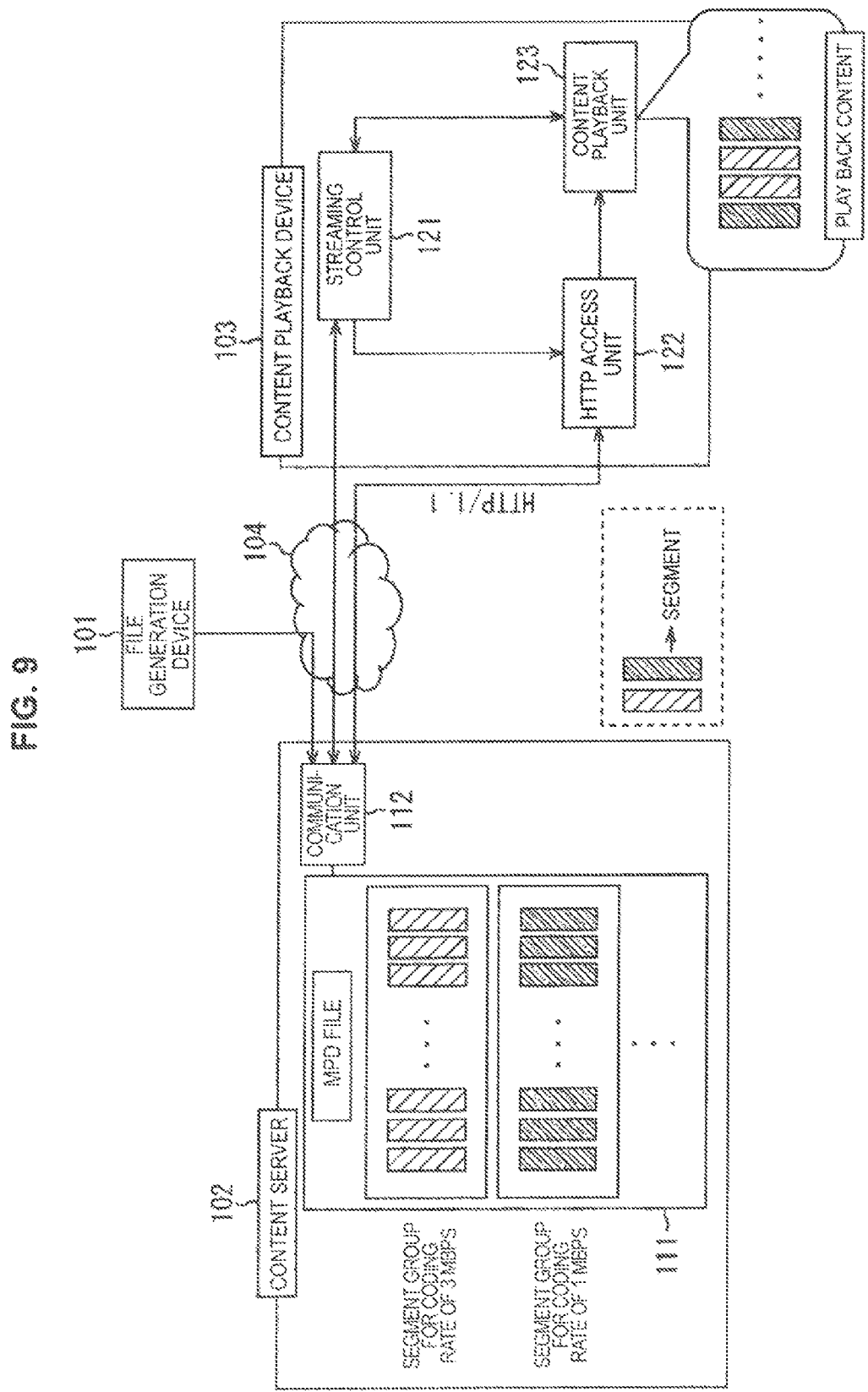
FIG. 9 is a block diagram illustrating an exemplary configuration of a content playback system.

FIG. 9 is a diagram illustrating an example of a content playback system applying the present technology.

In the example of FIG. 9, the content playback system includes a file generation device 101, a content server 102, a content playback device 103, and a network 104.

The file generation device 101, the content server 102, and the content playback device 103 are connected via the network 104. The network 104 may be a wireless transmission pathway, or a wired transmission pathway.

For example, the network 104 may encompass a public network such as the Internet, a telephone network, or a satellite communication network, and various local area networks (LANs) or wide area networks (WANs) including Ethernet (registered trademark). Additionally, the network 104 may also encompass a dedicated network such as an Internet Protocol virtual private network (IP-VPN).

Note that the file generation device 101 and the content server 102 may also 16 be connected by a network such as a dedicated line network separate from the network 104.

The file generation device 101 encodes content data, such as video content, for example, according to a scheme such as High Efficiency Video Coding (HEVC), for example. Subsequently, the file generation device 101 generates a data file of the encoded data (bit stream) and a data file (the MPD file discussed later) that includes metadata about the encoded data. For example, the file generation device 101 generates MP4 files conforming to MPEG-DASH, made up of segment groups with different coding rates. In other words, in the MP4 files, content at multiple bit rates is divided up into files lasting from a few seconds to approximately a dozen seconds.

Additionally, the encoded data is encoded in a structure obtained by dividing pictures into multiple tiles (tile-division structure). Subsequently, in the MP4 files including the encoded data, subsample access information (that is, gsix information) for acquiring arbitrary subsamples (tiles) is disposed at the beginning of the segment file.

Note that the content data may be audio data such as music, lectures, and radio programs, video data such as television programs, video programs, photographs, documents, drawings, and charts, or data such as games and software.

The file generation device 101 transmits the generated MP4 files to the content server 102 for storage in a storage unit 111 of the content server 102. Additionally, the file generation device 101 also transmits the generated MPD file to the content server 102 for storage in the storage unit 111 of the content server 102.

The content server 102 includes a storage unit 111 and a communication unit 112. The content server 102 stores, in the storage unit 111, MP4 files made up of segment groups with different coding rates generated by the file generation device 101.

In the example of FIG. 9, the storage unit 111 stores an MP4 file made up of a segment group with a coding rate of 3 Mbps, an MP4 file made up of a segment group with a coding rate of 1 Mbps, and so on.

The storage unit 111 may be a storage medium such as non-volatile memory, a magnetic disk, an optical disc, or a magneto-optical (MO) disc. The non-volatile memory may be electrically erasable programmable read-only memory (EEPROM) or erasable programmable read-only memory (EPROM), for example. Also, the magnetic disk may be a hard disk or a disk-shaped magnetic material disk. Also, the optical disc may be a Compact Disc (CD), a Digital Versatile Disc Recordable (DVD-R), a Blu-ray Disc (BD) (registered trademark), or the like.

In addition, the content server 102 also stores a playlist file (hereinafter designated the Media Presentation Description (MPD) file) including the attributes (bit rate information) and URL (access information) of each MP4 file stored in the storage unit 111. The MPD file may be generated by the file generation device 101, or generated by the content server 102.

The communication unit 112 functions as an interface with the file generation device 101, and communicates with the file generation device 101 via the network 104.

In addition, the communication unit 112 also functions as an interface with the content playback device 103, and communicates with the content playback device 103 via the network 104. In this case, more specifically, the communication unit 112 includes a function of an HTTP server that communicates with the content playback device 103 according to HTTP. For example, the communication unit 112 transmits the MPD file to the content playback device 103, extracts from the storage unit 111 an MP4 file requested on the basis of the MPD file from the content playback device 103 according to HTTP, and transmits the MP4 file to the content playback device 103 as an HTTP response.

The content playback device 103 analyzes the MPD file acquired from the content server 102, and on the basis of the analyzed MPD file, selects an optimal image size, at least one tile subdividing the screen, and a coding rate in consideration of the screen size and the state of the transmission pathway. For example, in the initial stage of playback, the delivery of segments with a coding rate of 1 Mbps is requested, and if the communication status is good, delivery is switched to segments with a coding rate of 3 Mbps. As another example, if the screen size is small, the delivery of segments of (only) arbitrary tiles corresponding to the screen size is requested. Segments received in this way are decoded, joined together into content, and displayed on-screen.

Note that the following specifically describes the case of playing back tiles. The content playback device 103 includes a streaming control unit 121, an HTTP access unit 122, and a content playback unit 123.

The streaming control unit 121 acquires an MPD file from the content server 102, and analyzes the acquired MPD file. The streaming control unit 121 selects the optimal image size, tiles, and coding rate in consideration of the screen size and the state of the transmission pathway on the basis of the analyzed MPD file, and acquires the URL (access) information of the segment files to acquire.

The streaming control unit 121 analyzes the range of index numbers of a Tile(A) within a segment file from the sidx/gsix acquired by the HTTP access unit 122. Note that in the case of trick play, the streaming control unit 121 analyzes the range of index numbers of an I/P Tile(A) within a segment file from the sidx/gsix acquired by the HTTP access unit 122. The streaming control unit 121 controls the HTTP access unit 122 on the basis of the analyzed information.

The HTTP access unit 122 uses access information from the streaming control unit 121 to acquire the initial segment. The HTTP access unit 122 analyzes the information required for playback from the information in the initial segment. For example, the tile numbers (indices) of the Tile(A) to be played back is analyzed from TileSampleGroupEntry. Furthermore, the HTTP access unit 122 acquires the sidx/ssix/gsix from the beginning of the segment file. Also, the HTTP access unit 122 acquires only Tile(A) from the content server 102 over HTTP, on the basis of the range of index numbers of Tile(A) within the segment file analyzed by the streaming control unit 121.

Note that in the case of trick play, the HTTP access unit 122 acquires only an I/P Tile(A)a from the content server 102 over HTTP, on the basis of the range of index numbers of the I/P Tile(A) within the segment file analyzed by the streaming control unit 121.

The content playback unit 123, under control by the streaming control unit 121, plays back the tiles (content) from the HTTP access unit 122. In other words, the content playback unit 123 decodes and joins together the tiles (content) from the HTTP access unit 122 as a single piece of content, and displays the content on a display unit (not illustrated).

Note that in the example of FIG. 9, only one device each of the file generation device 101, the content server 102, and the content playback device 103 is illustrated, but the configuration is not limited to one device each, and may also be configured with multiple devices.

Also, although the example of FIG. 9 illustrates an example in which the file generation device 101 and the content server 102 are configured separately, the file generation device 101 may also be built into the content server 102.

[Exemplary Configuration of File Generation Device]

Figure 10:
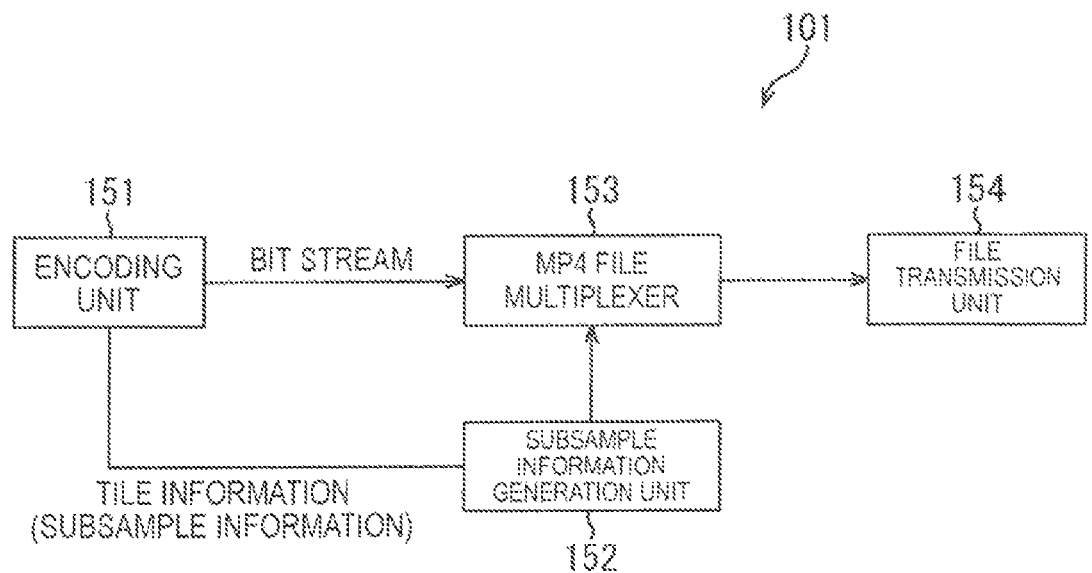
FIG. 10 is a block diagram illustrating an exemplary configuration of a file generation device.

FIG. 10 is a block diagram illustrating an exemplary configuration of the file generation device 101.

In the example of FIG. 10, the file generation device 101 encodes content data, and generates multiple MP4 files of the same content at different bit rates, as well as the MPD file discussed earlier. The file generation device 101 includes an encoding unit 151, a subsample information generation unit 152, an MP4 file multiplexer 153, and a file transmission unit 154.

The encoding unit 151 encodes content data with HEVC or the like, for example, to generate a bit stream, and supplies the generated bit stream to the MP4 file multiplexer 153. Note that during encoding, the encoding unit 151 encodes by dividing pictures into multiple tiles, and supplies information related to the tiles, such as tile position information (tile information), to the subsample information generation unit 152 as subsample information.

The subsample information generation unit 152, on the basis of the tile information from the encoding unit 151, generates subsample information to be included the moof of the MP4 files conforming to MPEG-DASH, and gsix information (FIG. 4), which is subsample access information for acquiring arbitrary subsamples (tiles). The subsample information generation unit 152 supplies the generated subsample information and gsix information to the MP4 file multiplexer 153.

The MP4 file multiplexer 153 generates MP4 files conforming to MPEG-DASH from the bit stream from the encoding unit 151, and multiplexes the subsample information and the gsix information from the subsample information generation unit 152. In other words, there are generated MP4 files in which the subsample information and the gsix information are multiplexed. Note that, specifically, the subsample information is stored in the subsample information box within the moof. The gsix information is stored in the gsix following the sidx and the ssx at the beginning of the segment file.

The MP4 files multiplexed and generated by the MP4 file multiplexer 153 are supplied to the file transmission unit 154. The file transmission unit 154 transmits the MP4 files to the content server 102 for storage in the storage unit 111.

Note that, although not illustrated in the example of FIG. 10, in actual practice, the file generation device 101 is also made up of an MPD file generation unit, by which an MPD file is generated. Subsequently, the generated MPD file is stored in the storage unit 111 of the content server 102 by the file transmission unit 154.

[File Generation Process]

Figure 11:
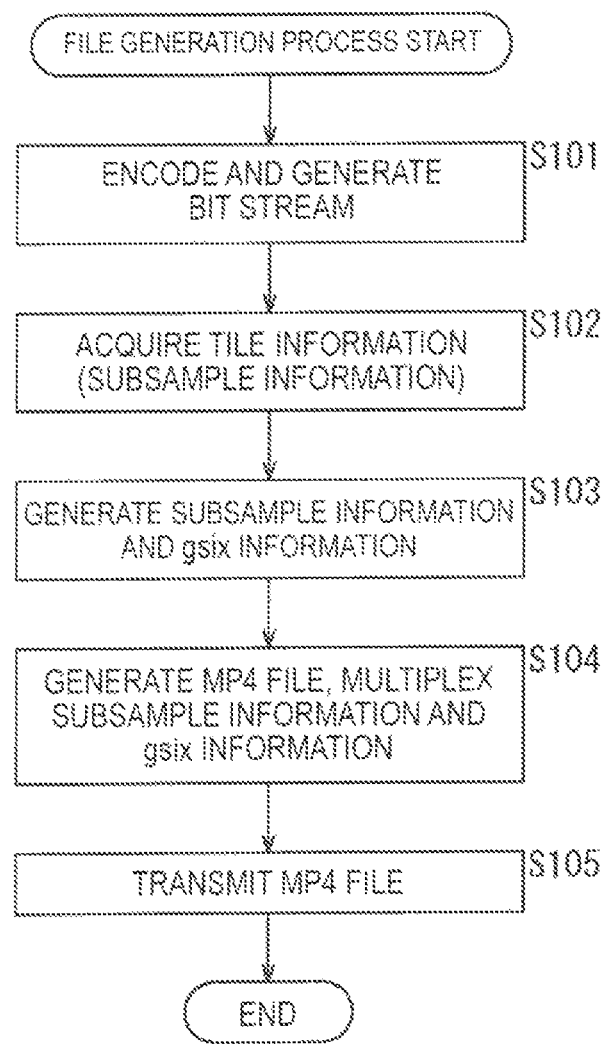
FIG. 11 is a flowchart explaining a file generation process.

Next, a file generation process by the file generation device 101 will be described with reference to the flowchart in FIG. 11.

In step S101, the encoding unit 151 encodes content data with HEVC or the like, for example, and generates a bit stream. The encoding unit 151 supplies the generated bit stream to the MP4 file multiplexer 153.

Also, during encoding, the encoding unit 151 encodes by dividing pictures 6 into multiple tiles, and supplies information related to the tiles to the subsample information generation unit 152 as subsample information.

Correspondingly, in step S102, the subsample information generation unit 152 acquires tile information as subsample information.

In step S103, the subsample information generation unit 152, on the basis of the tile information, generates subsample information to be included in the moof of MP4 files conforming to MPEG-DASH, and gsix information (FIG. 4) storing information for acquiring arbitrary subsamples (tiles).

In step S104, the MP4 file multiplexer 153 generates MP4 files conforming to MPEG-DASH from the HEVC bit stream from the encoding unit 151, and multiplexes the subsample information and the gsix information from the subsample information generation unit 152. In other words, there are generated MP4 files in which the subsample information and the gsix information are multiplexed. Note that, specifically, the subsample information is stored in the subsample information box in the moof. The gsix information is stored in the gsix following the sidx and the ssx at the beginning of the segment file.

The MP4 files multiplexed and generated by the MP4 file multiplexer 153 are supplied to the file transmission unit 154. In step S105, the file transmission unit 154 transmits the MP4 files to the content server 102 for storage in the storage unit 111.

[Example of Tile Playback Process]

Figure 12:
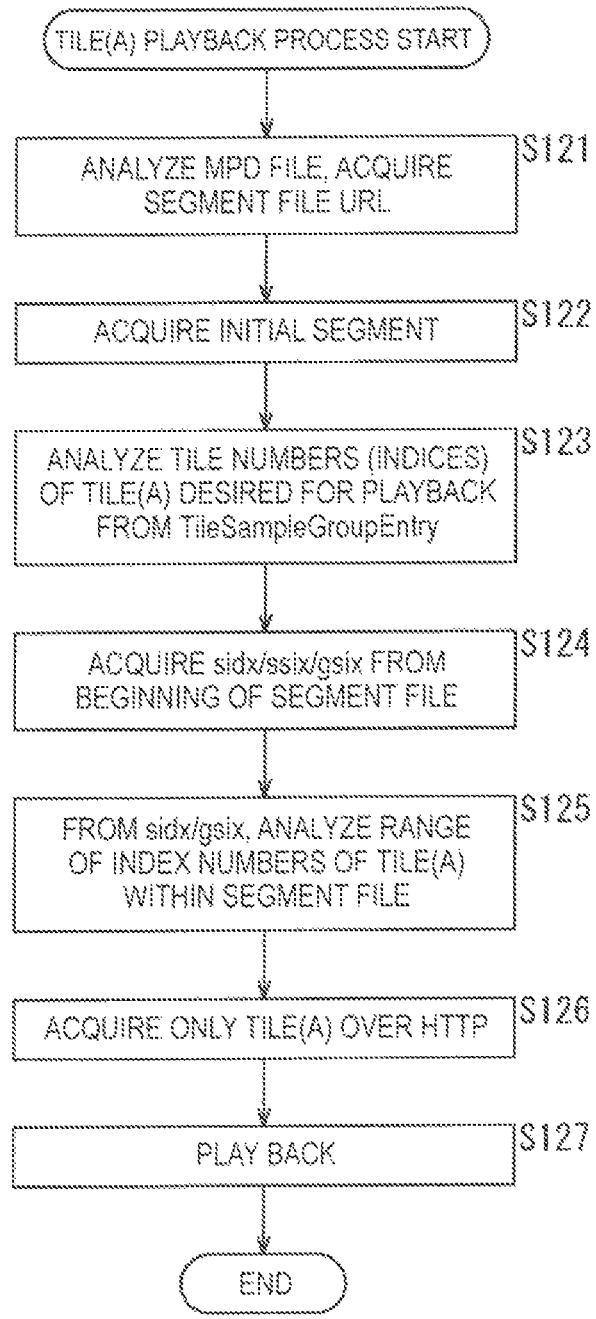
FIG. 12 is a flowchart explaining an example of a Tile(A) playback process.

Next, a Tile(A) playback process of the content playback device 103 will be described with reference to the flowchart in FIG. 12.

In step S121, the streaming control unit 121 analyzes the MPD file in the storage unit 111 of the content server 102, and acquires the URL (access) information of a segment file to acquire. In other words, the streaming control unit 121 selects the optimal image size, tiles, and coding rate in consideration of the screen size and the state of the transmission pathway on the basis of the analyzed MPD file, and thereby acquires the URL (access) information of the segment file to acquire. The access information is supplied to the HTTP access unit 122.

In step S122, the HTTP access unit 122 uses access information from the streaming control unit 121 to acquire the initial segment of an MP4 file at the desired coding rate.

In step S123, the HTTP access unit 122 analyzes the tile numbers (indices) of Tile(A) desired for playback from TileSampleGroupEntry of the initial segment. In step S124, the HTTP access unit 122 acquires the sidx/ssix/gsix from the beginning of the segment file.

In step S125, the streaming control unit 121 analyzes the range of index numbers of Tile(A) within the segment file from the sidx/gsix acquired by the HTTP access unit 122.

In step S126, the HTTP access unit 122 acquires only Tile(A) from the content server 102. In other words, the HTTP access unit 122 acquires only Tile(A) from the content server 102 over HTTP, on the basis of the range of index numbers of the Tile(A) within the segment file analyzed by the streaming control unit 121.

In step S127, the content playback unit 123, under control by the streaming control unit 121, plays back Tile(A) (content) from the HTTP access unit 122. In other words, the content playback unit 123 decodes and joins together Tile (A) (content) from the HTTP access unit 122 as a single piece of content, and displays the content on a display unit (not illustrated).

As above, information for acquiring arbitrary subsamples (tiles) is disposed (in the gsix) at the beginning of the segment file, and thus efficient data acquisition over HTTP may be realized.

[Example of Tile Trick Play Process]

Figure 13:
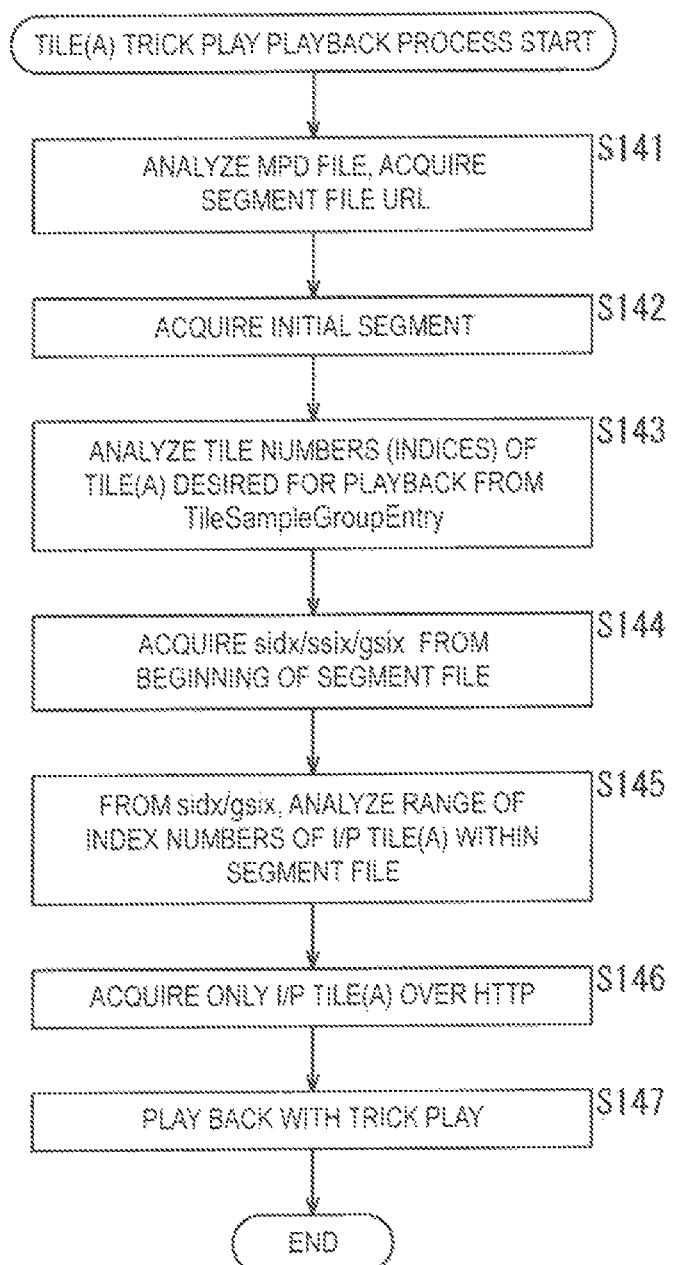
FIG. 13 is a flowchart explaining an example of a Tile(A) trick play playback process.

Next, a Tile(A) trick play playback process of the content playback device 103 will be described with reference to the flowchart in FIG. 13.

In step S141, the streaming control unit 121 analyzes the MPD file in the storage unit 111 of the content server 102, and acquires the URL (access) information of a segment file to acquire. The access information is supplied to the HTTP access unit 122.

In step S142, the HTTP access unit 122 uses access information from the streaming control unit 121 to acquire the initial segment of an MP4 file at the desired coding rate.

In step S143, the HTTP access unit 122 analyzes the tile numbers (indices) of Tile(A) desired for playback from TileSampleGroupEntry of the initial segment. In step S144, the HTTP access unit 122 acquires the sidx/ssix/gsix from the beginning of the segment file.

In step S145, the streaming control unit 121 analyzes the range of index numbers of I/P Tile(A) within the segment file from the sidx/gsix acquired by the HTTP access unit 122.

In step S146, the HTTP access unit 122 acquires only I/P Tile(A) from the content server 102. In other words, the HTTP access unit 122 acquires only I/P Tile(A) from the content server 102 over HTTP, on the basis of the range of index numbers of I/P Tile(A) within the segment file analyzed by the streaming control unit 121.

In step S147, the content playback unit 123, under control by the streaming control unit 121, plays back I/P Tile(A) (content) from the HTTP access unit 122. Consequently, the content playback unit 123 decodes and joins together Tile (A) (content) from the HTTP access unit 122 as a single piece of content, and displays the content on a display unit (not illustrated).

As above, information for acquiring arbitrary subsamples (tiles) is disposed (in the gsix) at the beginning of the segment file, and thus efficient data acquisition over HTTP for trick play playback may be realized.

The case in which the HEVC tiles are composed of multiple tracks, which was mentioned as an alternative case in the description of FIG. 7, will now be described in detail. As an example, an example will be described in which, in an MP4 file conforming to MPEG-DASH, multiple tracks having tile information are configured in association with subsegments. Specifically, an example will be described in which, when the HEVC tiles are composed of multiple tracks in an MP4 file conforming to MPEG-DASH, track references and extractors are used.

[Exemplary Configuration of MP4 File Conforming to MPBEG-DASH]

Figure 14:
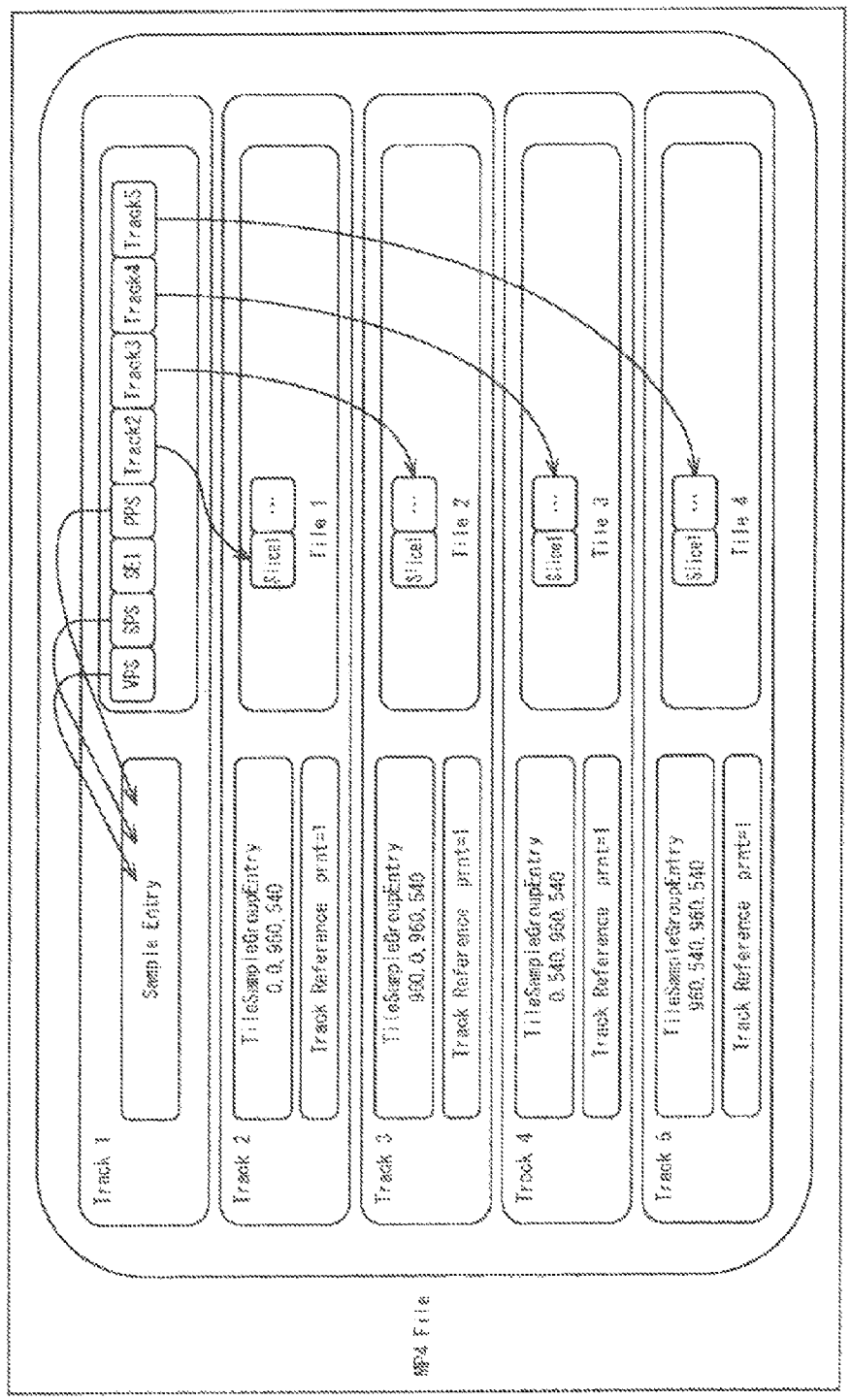
FIG. 14 is a diagram illustrating an exemplary logical configuration of an MP4 file conforming to MPEG-DASH.

FIG. 14 illustrates an exemplary logical configuration of an MP4 file conforming to MPEG-DASH. In the example of FIG. 14, the MP4 file is composed of five tracks.

Track 1 includes extractors equal to the number of tracks. An extractor is reference information for referencing the tile in each track. Track 2 to Track 5 each includes a tile made up of slices and a reference stated as a track reference. Herein, Track Reference prnt=1 indicates, as a track reference, that 1 is the number of the track in which parameters are stored.

Figure 15:
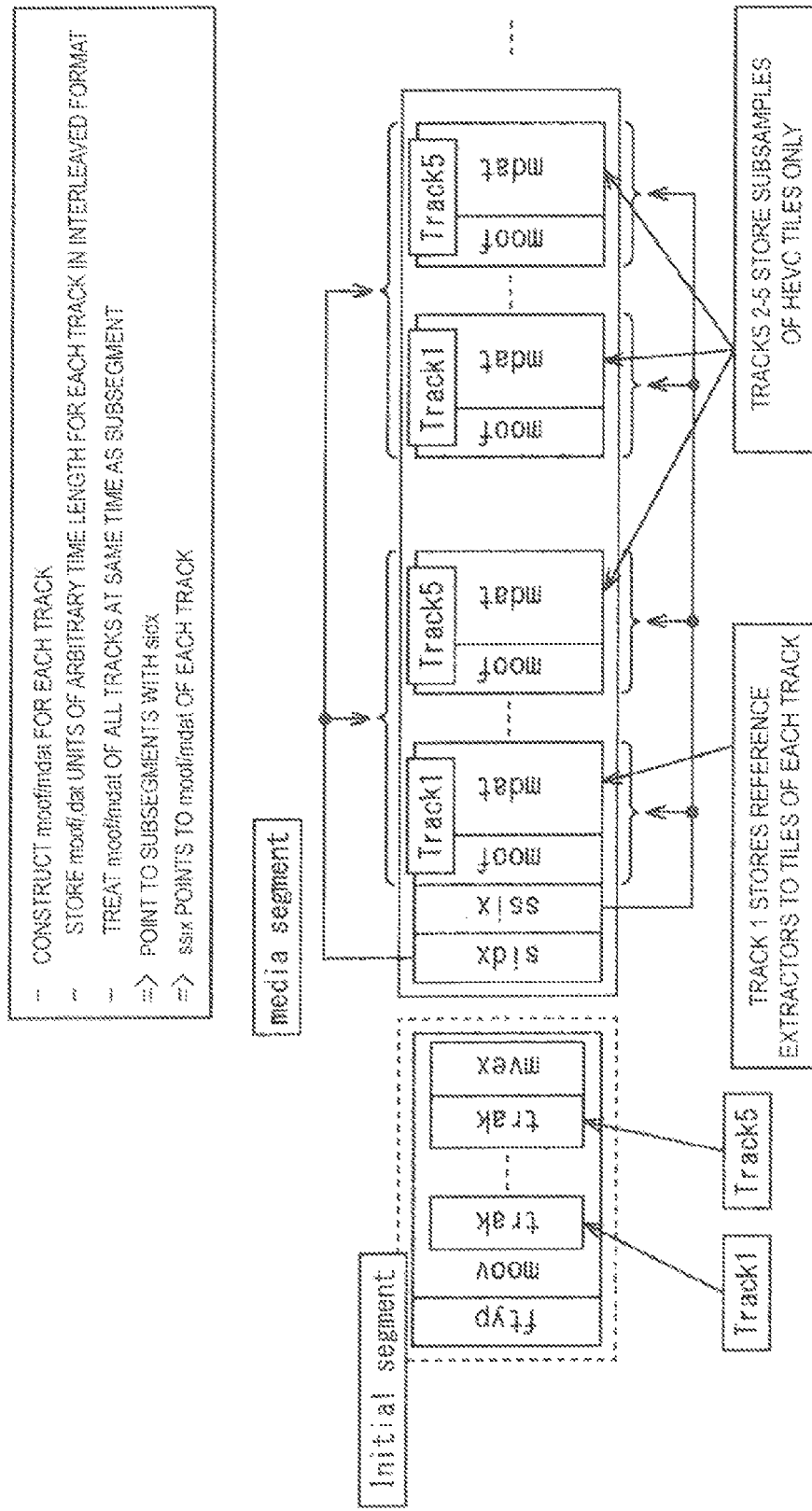
FIG. 15 is a diagram illustrating an exemplary configuration of the MP4 file in FIG. 14.

FIG. 15 illustrates the MP4 segment file structure conforming to MPEG-DASH in the case of FIG. 14. Note that in the example of FIG. 15, description will be reduced or omitted for portions that are the same as in the example of FIG. 1.

In the media segment file in the example of FIG. 15, each track is disposed following the sidx and the ssix, with each track being made up of a moof and an mdat. In other words, the example of FIG. 15 is an example in which the data divided into tracks is managed on a per-track basis.

The tracks are stored in an interleaved format of moof/mdat units of arbitrary time length for each track. The moofs/mdats of all tracks at the same time are treated as subsegments. Also, the sidx points to subsegments, while the ssix points to the moof/mdat of each track. In other words, the sidx may be used to point to a clump of subsegments from Track 1 to 5, while the ssix may be used to point to the fragment for each tile.

Additionally, in the example of FIG. 15, in Track 1, the extractors, which are the reference information for referencing the tile in each track, are stored in the mdat. In Track 2 to Track 5, the subsamples of HEVC tiles only are stored.

Figure 16:
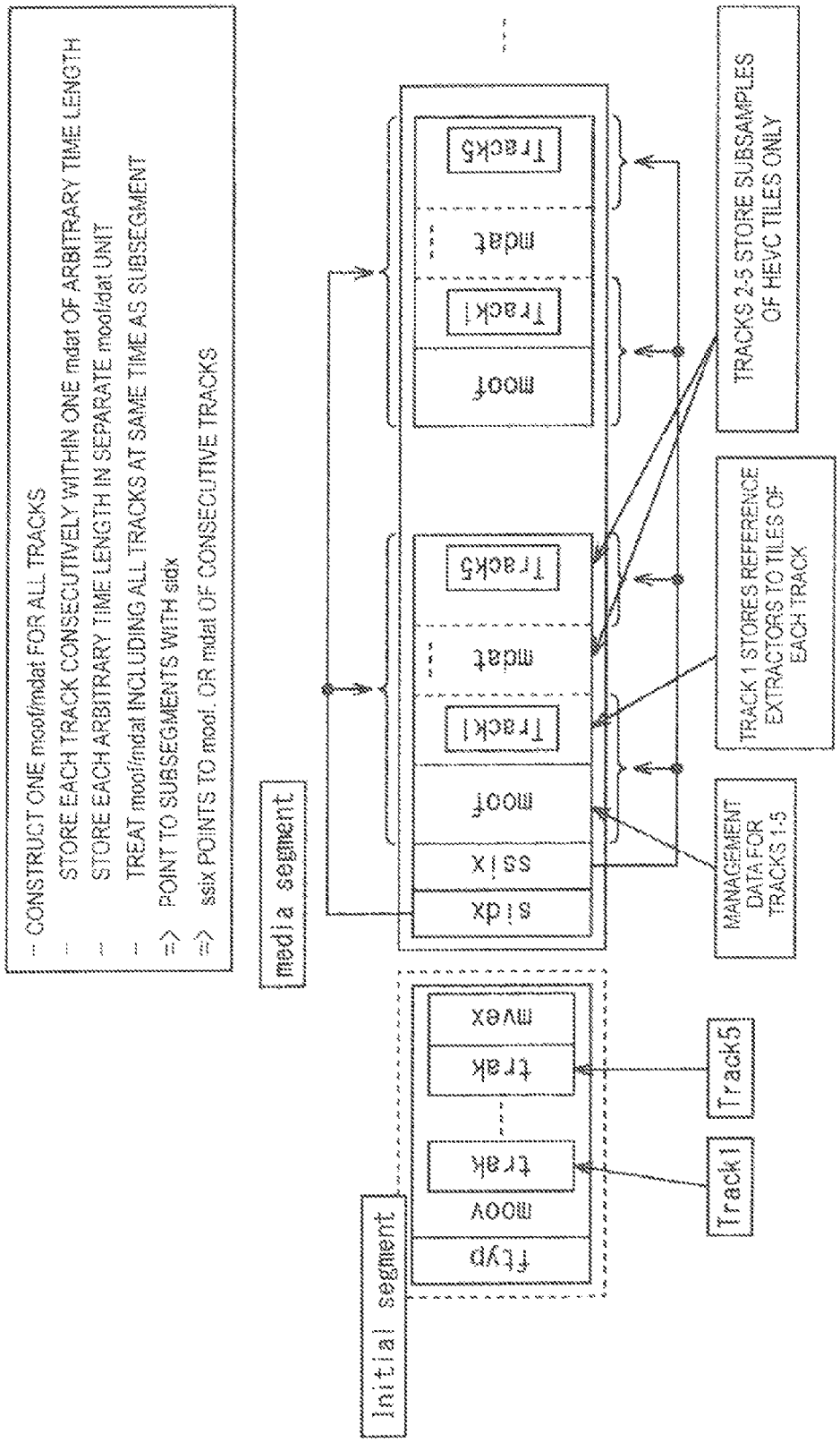
FIG. 16 is a diagram illustrating another exemplary configuration of the MP4 file in FIG. 14.

FIG. 16 illustrates another example of the MP4 segment file structure conforming to MPEG-DASH in the case of FIG. 14.

In the media segment file in the example of FIG. 16, all tracks are made up of a single moof/mdat. In other words, the example of FIG. 16 is an example in which the data divided into tracks is managed as one.

Within one mdat of arbitrary time, data only is stored consecutively for each track. The tracks for each arbitrary time length are stored in separate moof/mdat units. The moofs/mdats including all tracks at the same time are treated as subsegments. Also, the sidx points to subsegments, while the mix points to the moof/mdat of each track. In other words, the sidx may be used to point to one moof containing Tiles 1 to 5, while the ssix may be used to indicate the moof and the extractor to the tile of each track, and may point to only the tiles from Tracks 2 to 5.

Additionally, in the example of FIG. 16, Track 1 stores the reference extractors to the tile of each track. Tracks 2 to 4 store the subsegments of HEVC tiles only.

[File Generation Process]

Figure 17:
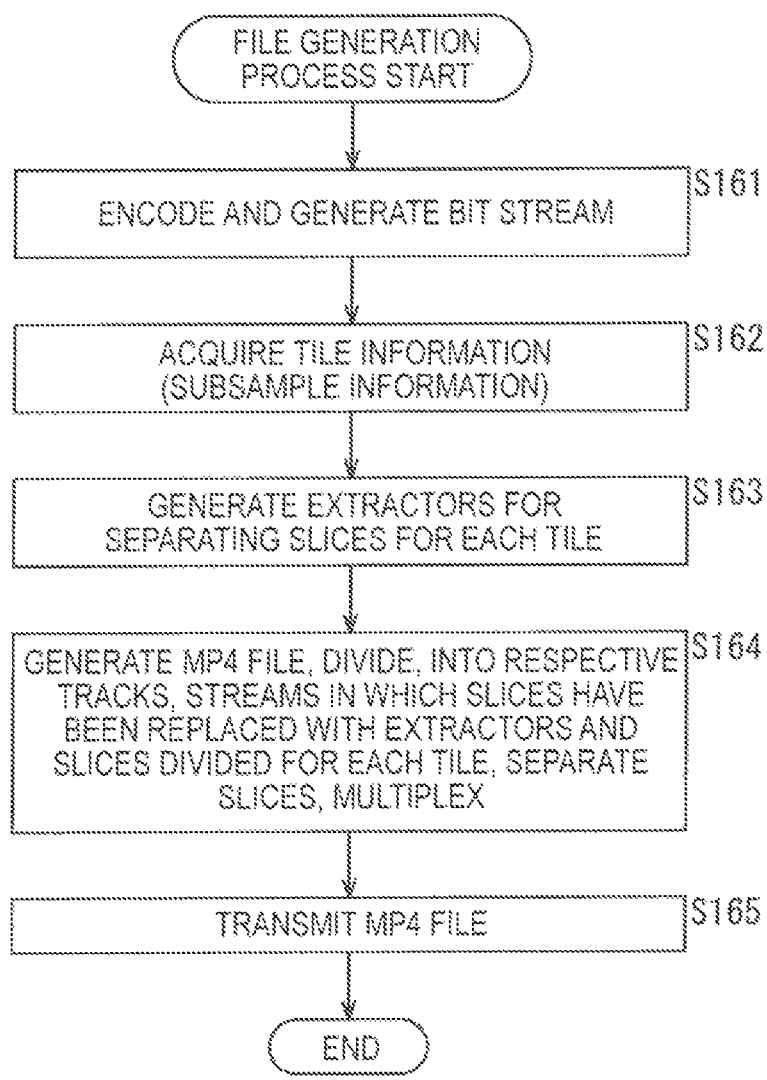
FIG. 17 is a flowchart explaining a file generation process.

Next, a file generation process in the example of FIG. 15 or FIG. 16 will be described with reference to the flowchart in FIG. 17. Note that this process is conducted by the file generation device 101 of FIG. 10 discussed earlier.

In step S161, the encoding unit 151 encodes content data with HEVC or the like, for example, and generates a bit stream. The encoding unit 151 supplies the generated bit stream to the MP4 file multiplexer 153.

Also, during encoding, the encoding unit 151 encodes by dividing pictures into multiple tiles, and supplies information related to the tiles to the subsample information generation unit 152 as subsample information.

Correspondingly, in step S162, the subsample information generation unit 152 acquires tile information as subsample information.

In step S163, the subsample information generation unit 152 generates extractors for separating the slices for each tile.

In step S164, the MP4 file multiplexer 153 generates MP4 files, divides, into respective tracks, the streams in which the slices have been replaced with extractors and the slices divided for each tile, separates the slices, and multiplexes the result. At this point, the method of multiplexing may be as illustrated by the file structure in FIG. 15 or the file structure in FIG. 16.

The MP4 files multiplexed and generated by the MP4 file multiplexer 153 are supplied to the file transmission unit 154. In step S105, the file transmission unit 154 transmits the MP4 files to the content server 102 for storage in the storage unit 111.

[Example of Tile Track Playback Process]

Figure 18:
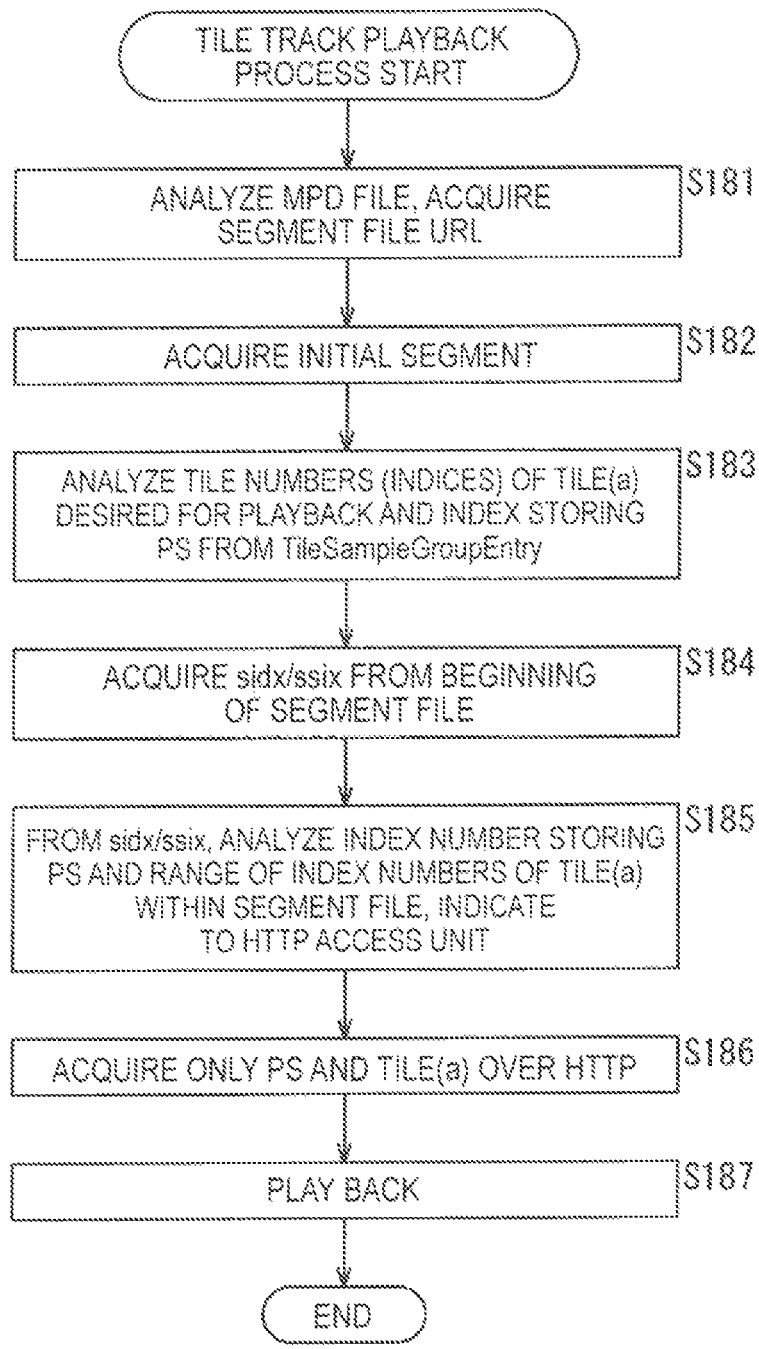
FIG. 18 is a flowchart explaining an example of a tile track playback process.

Next, a tile track playback process in the example of FIG. 15 or FIG. 16 will be described with reference to the flowchart in FIG. 18. Note that this process is executed by the content playback device 103 of FIG. 9.

In step S181, the streaming control unit 121 analyzes the MPD file in the storage unit 111 of the content server 102, and acquires the URL (access) information of a segment file to acquire. The access information is supplied to the HTTP access unit 122.

In step S182, the HTTP access unit 122 uses access information from the streaming control unit 121 to acquire the initial segment of an MP4 file at the desired coding rate.

In step S183, the HTTP access unit 122 analyzes the tile numbers (indices) of Tile(a) desired for playback and the number (index) where a parameter set (PS) is stored from TileSampleGroupEntry of the initial segment. In step S184, the HTTP access unit 122 acquires the sidx/ssix from the beginning of the segment file.

In step S185, the streaming control unit 121 analyzes the index number where the PS is stored and the range of index numbers of Tile(a) within the segment file from the sidx/gsix acquired by the HTTP access unit 122.

In step S186, the HTTP access unit 122 acquires only the PS and Tile(a) from the content server 102. In other words, the HTTP access unit 122 acquires only Tile(a) from the content server 102 over HTTP, on the basis of the range of index numbers of Tile(a) within the segment file analyzed by the streaming control unit 121.

In step S187, the content playback unit 123, under control by the streaming control unit 121, plays back Tile(a) (content) from the HTTP access unit 122. Consequently, the content playback unit 123 decodes and joins together Tile(a) (content) from the HTTP access unit 122 as a single piece of content, and displays the content on a display unit (not illustrated).

As above, in the case of the file structures in FIG. 15 and FIG. 16, MP4 segment files conforming to MPEG-DASH likewise may be played back with good access.

[Exemplary Configuration of MP4 File Conforming to MPEG-DASH]

Figure 19:
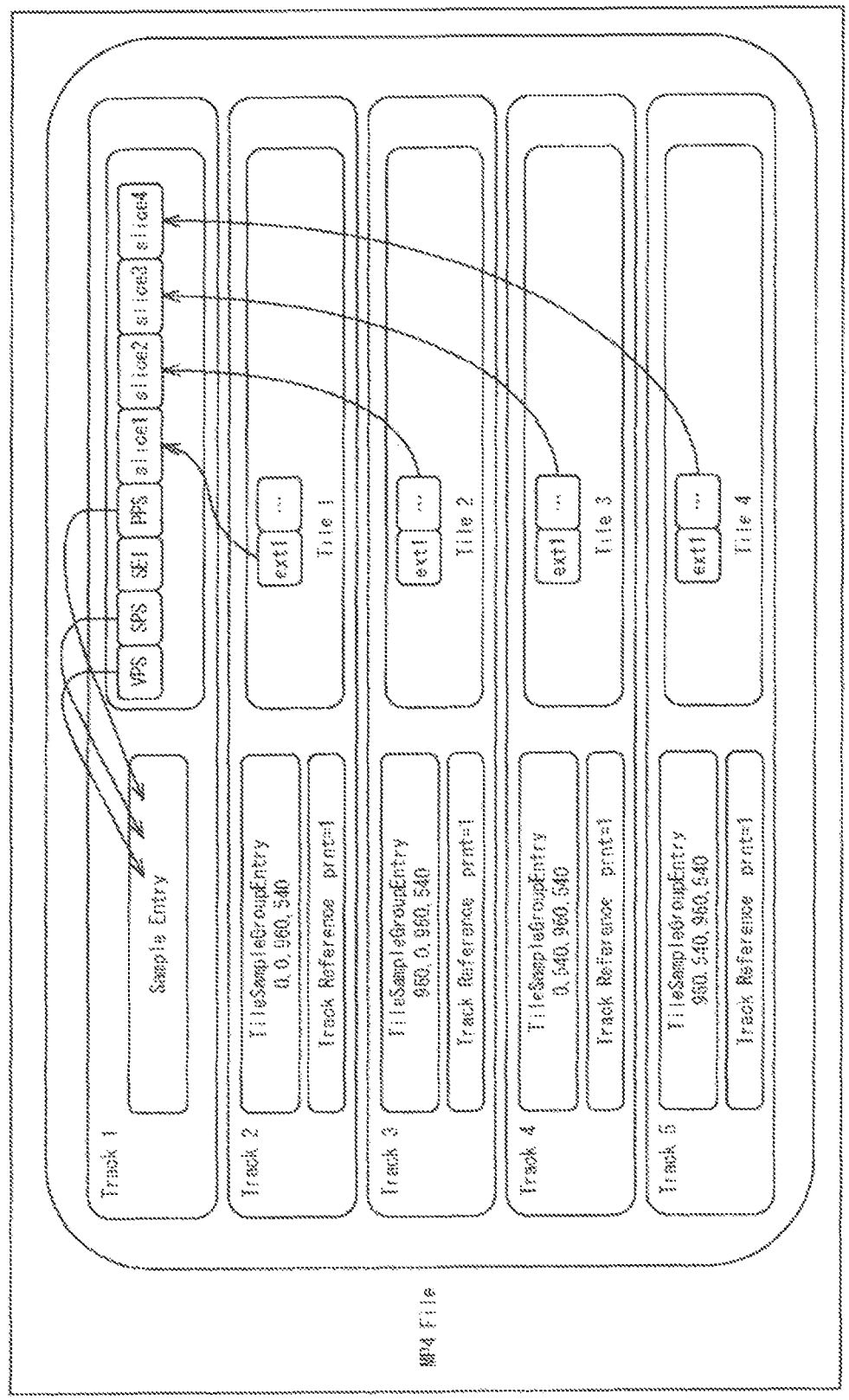
FIG. 19 is a diagram illustrating another example of a logical configuration of an MP4 file conforming to MPEG-DASH.

FIG. 19 illustrates an exemplary logical configuration of an MP4 file conforming to MPEG-DASH. In the example of FIG. 19, the substance of files (slices) that had been disposed in other tracks in the case of FIG. 14 is disposed in Track 1, whereas the extractors to tracks that had been disposed in Track 1 in the case of FIG. 14 are disposed in Track 2 to Track 5 as tiles.

In other words, Track 1 stores ordinary HEVC slices. In contrast, Track 2 to Track 4 include references by track references and references to slices by extractor. In other words, Tracks 2 to 4 form an access table for acquiring arbitrary tiles from Track 1.

Figure 20:
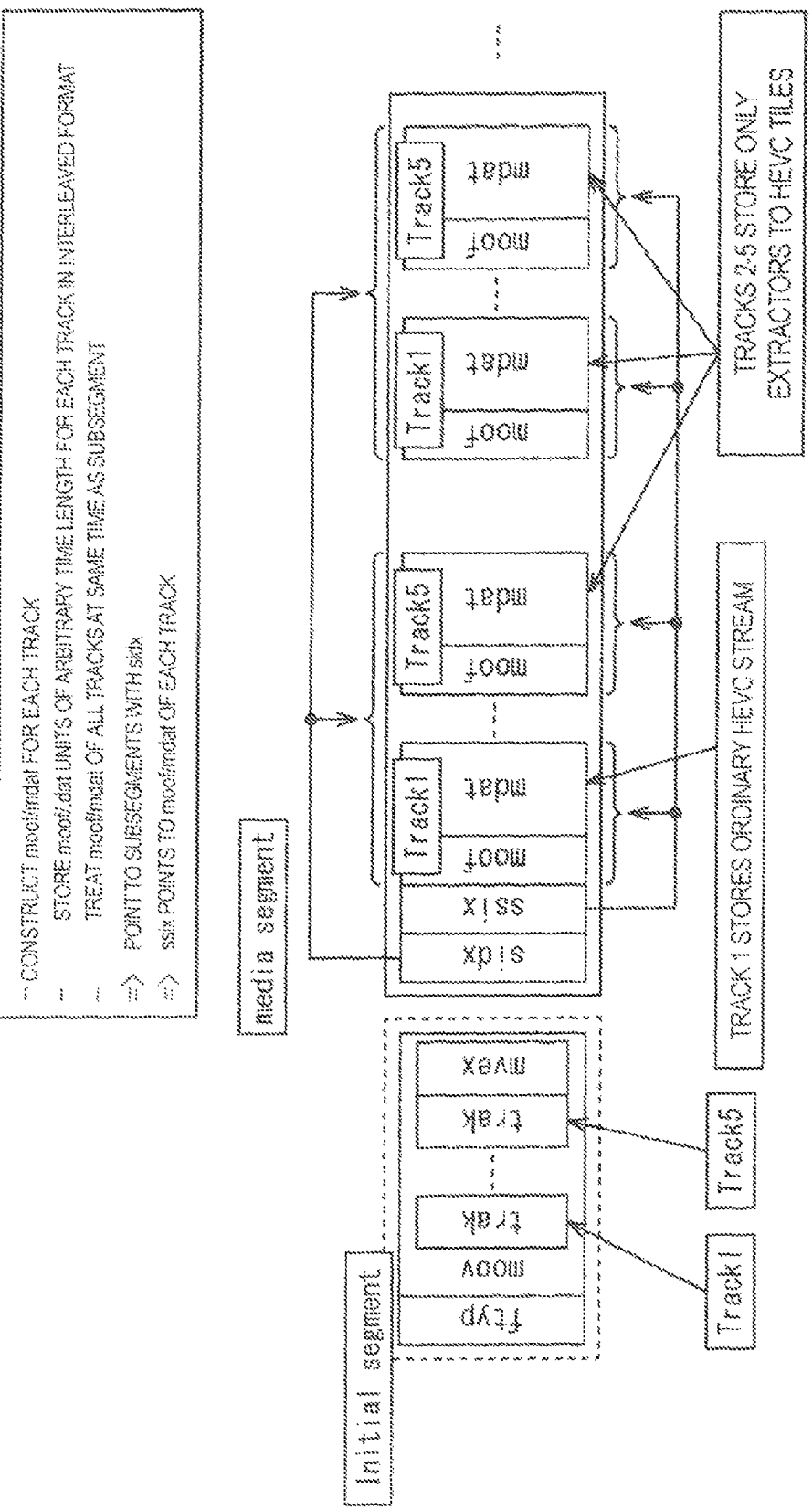
FIG. 20 is a diagram illustrating an exemplary configuration of the MP4 file in FIG. 19.

FIG. 20 illustrates the MP4 segment file structure conforming to MPEG-DASH in the case of FIG. 19. Note that in the example of FIG. 20, description will be reduced or omitted for portions that are the same as in the example of FIG. 15.

Namely, the file structure of FIG. 20 differs from the file structure of FIG. 15 in that an HEVC stream is stored in Track 1, and only extractors to HEVC tiles are stored in Track 2 to Track 5.

Figure 21:
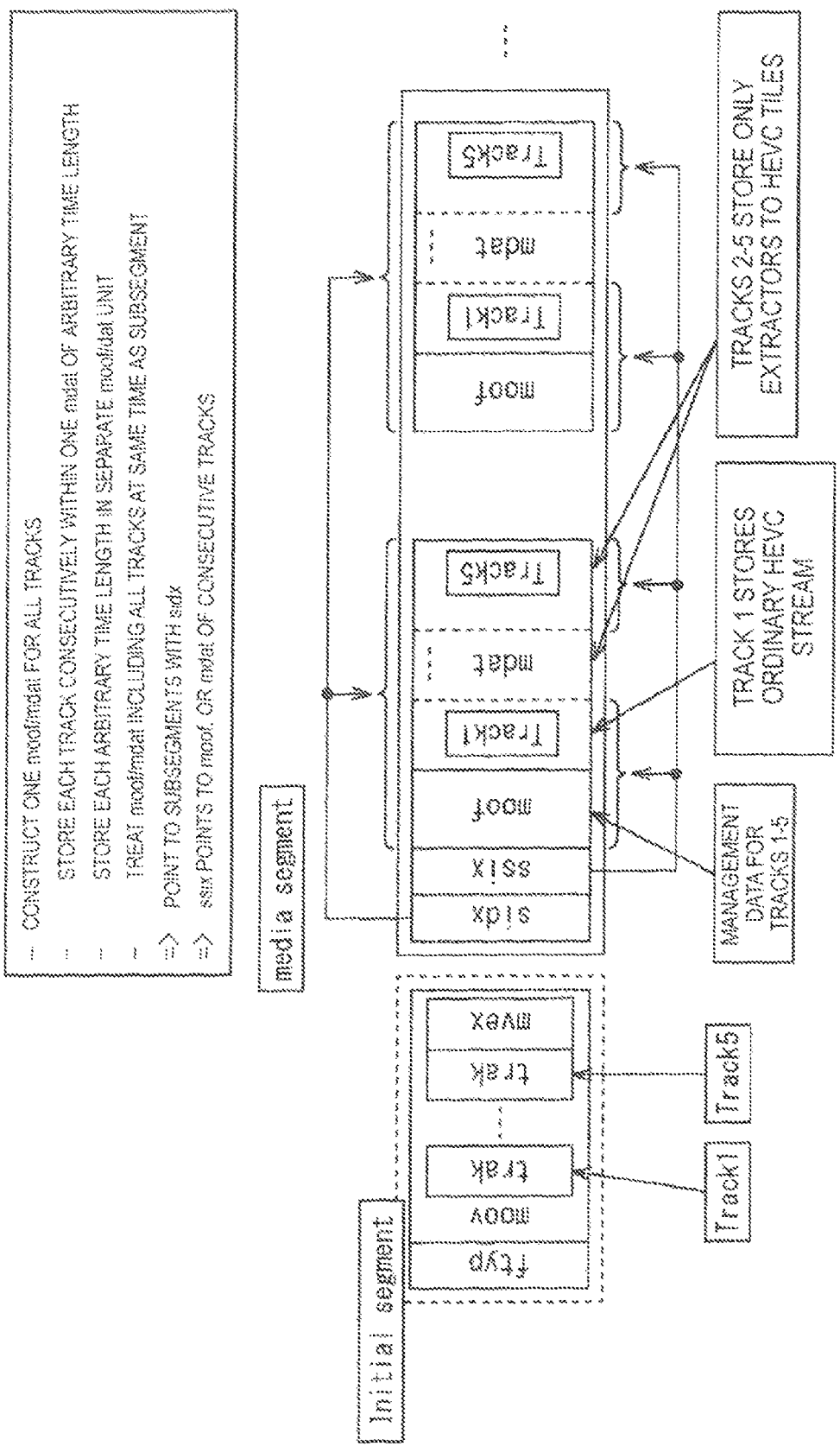
FIG. 21 is a diagram illustrating another exemplary configuration of the MP4 file in FIG. 19.

FIG. 21 illustrates another example of the MP4 segment file structure conforming to MPEG-DASH in the case of FIG. 19. Note that in the example of FIG. 21, description will be reduced or omitted for portions that are the same as in the example of FIG. 16.

Namely, the file structure of FIG. 21 differs from the file structure of FIG. 15 in that an HEVC stream is stored in Track 1, and only extractors to HEVC tiles are stored in Track 2 to Track 5.

[File Generation Process]

Figure 22:
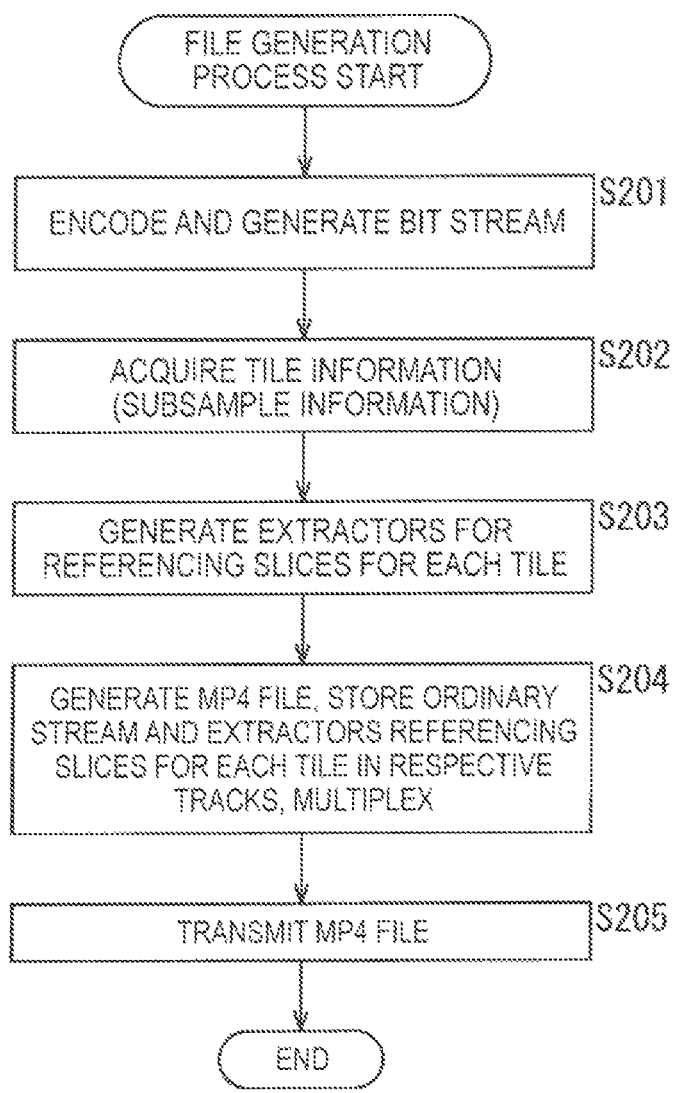
FIG. 22 is a flowchart explaining a file generation process.

Next, a file generation process in the example of FIG. 20 or FIG. 21 will be described with reference to the flowchart in FIG. 22. Note that this process is conducted by the file generation device 101 of FIG. 10 discussed earlier.

In step S201, the encoding unit 151 encodes content data with HEVC or the like, for example, and generates a bit stream. The encoding unit 151 supplies the generated bit stream to the MP4 file multiplexer 153.

Also, during encoding, the encoding unit 151 encodes by dividing pictures into multiple tiles, and supplies information related to the tiles to the subsample information generation unit 152 as subsample information.

Correspondingly, in step S202, the subsample information generation unit 152 acquires tile information as subsample information.

In step S203, the subsample information generation unit 152 generates extractors for referencing the slices for each tile.

In step S204, the MP4 file multiplexer 153 generates MP4 files, stores the ordinary stream and the extractors referencing the slices for each tile in respective tracks, and multiplexes the result. At this point, the method of multiplexing may be as illustrated by the file structure in FIG. 20 or the file structure in FIG. 21.

The MP4 files multiplexed and generated by the MP4 file multiplexer 153 are supplied to the file transmission unit 154. In step S205, the file transmission unit 154 transmits the MP4 files to the content server 102 for storage in the storage unit 111.

[Example of Tile Track Playback Process]

Figure 23:
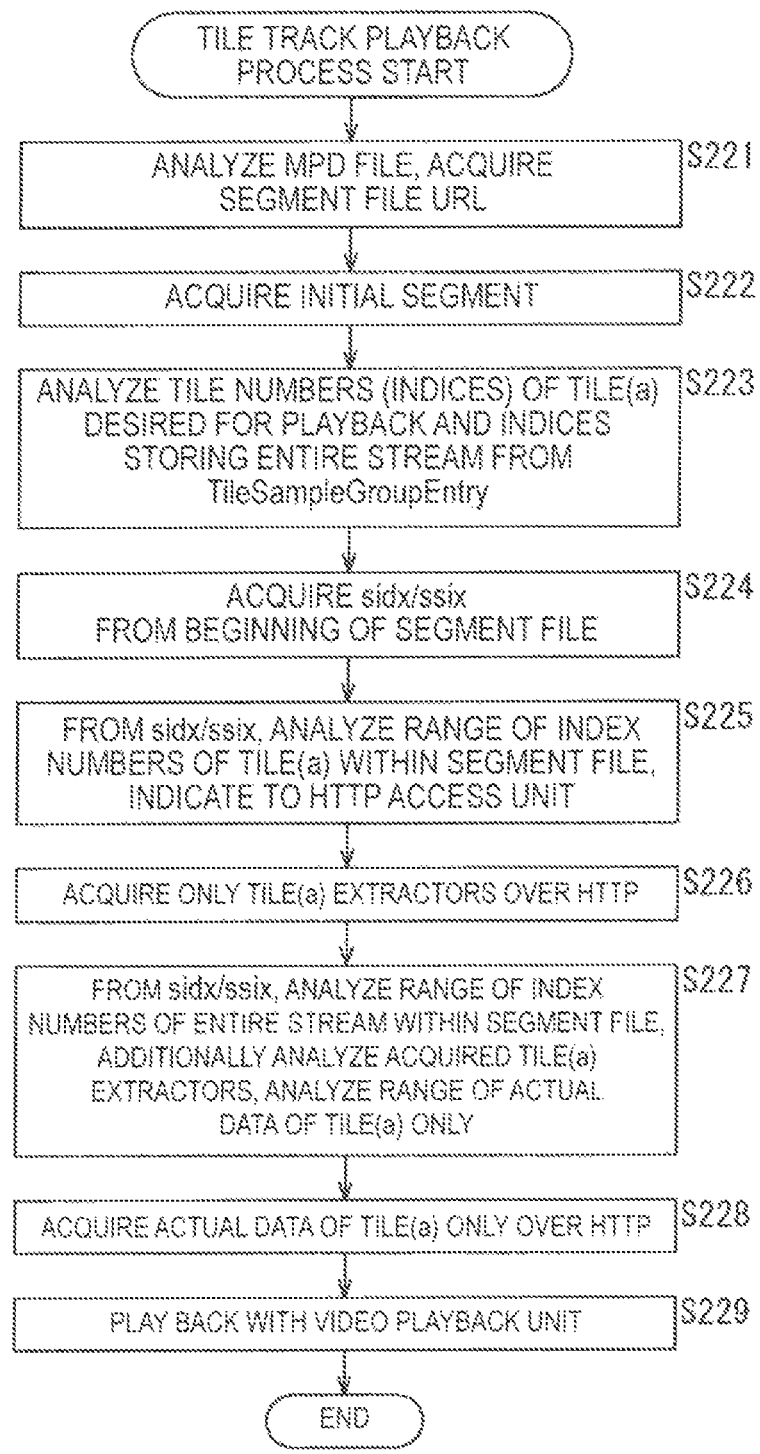
FIG. 23 is a flowchart explaining an example of a tile track playback process.

Next, a tile track playback process in the example of FIG. 20 or FIG. 21 will be described with reference to the flowchart in FIG. 23. Note that this process is executed by the content playback device 103 of FIG. 9.

In step S221, the streaming control unit 121 analyzes the MPD file in the storage unit 111 of the content server 102, and acquires the URL (access) information of a segment file to acquire. The access information is supplied to the HTTP access unit 122.

In step S222, the HTTP access unit 122 uses access information from the streaming control unit 121 to acquire the initial segment of an MP4 file at the desired coding rate.

In step S223, the HTTP access unit 122 analyzes the tile numbers (indices) of Tile(A) desired for playback and the numbers (indices) where the entire stream is stored from TileSampleGroupEntry of the initial segment. In step S224, the HTTP access unit 122 acquires the sidx/ssix from the beginning of the segment file.

In step S225, the streaming control unit 121 analyzes the range of index numbers of Tile(A) within the segment file from the sidx/ssix acquired by the HTTP access unit 122.

In step S226, the HTTP access unit 122 acquires only the extractors of Tile(a) from the content server 102.

In step S227, the streaming control unit 121 analyzes, from the sidx/ssix, the range of index numbers of the entire stream within the segment file, and additionally analyzes the acquired Tile(a) extractors to analyze the range of only the actual data of Tile(a).

In step S228, the HTTP access unit 122 acquires only the actual data of Tile(a) from the content server 102.

In step S229, the content playback unit 123, under control by the streaming control unit 121, plays back Tile(a) (content) from the HTTP access unit 122. Consequently, the content playback unit 123 decodes and joins together Tile(a) (content) from the HTTP access unit 122 as a single piece of content, and displays the content on a display unit (not illustrated).

As above, in the case of the file structures in FIG. 20 and FIG. 21, MP4 segment files conforming to MPEG-DASH likewise may be played back with good access.

Note that in the case of playing back everything in the example of FIG. 14, all of Tracks 1 to 5 must be played back, but in the case of playing back everything in the example of FIG. 19, Track 1 by itself is sufficient, and Tracks 2 to 5 are not needed. Also, in the case of partial playback, it is sufficient to bring only the needed tracks.

Also, in the case of conducting partial playback, the per-track file structure in FIG. 15 is more efficient than the MP4 file structure in FIG. 16. Similarly, in the case of conducting partial playback, the per-track file structure in FIG. 20 is more efficient than the MP4 file structure in FIG. 21.

Note that the storage order of the fragments (moof+mdat) in each track in FIGS. 15 and 20 may be other than the order in the illustrated examples. Also, the storage order of tracks within the mdat of the fragments (moof+mdat) in FIGS. 16 and 21 may be other than the order in the illustrated examples.

In addition, regarding the storage order of fragments (moof+mdat) for each track in FIG. 20 and the storage order of tracks within the mdat of the fragments (moof+mdat) in FIG. 21, if the extractor Tracks 2 to 5 are stored in front of Track 1, acquisition over HTTP as a contiguous area together with the sidx/ssix becomes possible, and the transmission efficiency may be raised further.

Note that although the above description describes an example of converting a bit stream encoded by HEVC into files, the coding method is not limited to HEVC, insofar as the coding method has a tiled structure that subdivides the screen.

In addition, although the above description describes examples of an MP4 file format, the file format is not limited to an MP4 file format or an AVC file format. Insofar as the problems and advantageous effects according to the present technology are the same, the present technology may also applied similarly to a different file format, a stream used during transmission, and a stream used when storing files.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 24 is a block diagram showing an example configuration of the hardware of a computer that executes the series of processes described earlier according to a program.

In the computer 800, a central processing unit (CPU) 801, a read only memory (ROM) 802 and a random access memory (RAM) 803 are mutually connected by a bus 804.

An input/output interface 805 is also connected to the bus 804. An input unit 806, an output unit 807, a storage unit 808, a communication unit 809, and a drive 810 are connected to the input/output interface 805.

The input unit 806 is configured from a keyboard, a mouse, a microphone or the like. The output unit 807 configured from a display, a speaker or the like. The storage unit 808 is configured from a hard disk, a non-volatile memory or the like. The communication unit 809 is configured from a network interface or the like. The drive 810 drives a removable recording medium 811 such as a magnetic disk, an optical disk, a magneto-optical disk, a semiconductor memory or the like.

In the computer configured as described above, the CPU 801 loads a program that is stored, for example, in the storage unit 808 onto the RAM 803 via the input/output interface 805 and the bus 804, and executes the program. Thus, the above-described series of processing is performed.

As one example, the program executed by the computer 800 (the CPU 801) may be provided by being recorded on the removable recording medium 811 as a packaged medium or the like. The program can also be provided via a wired or wireless transfer medium, such as a local area network, the Internet, or a digital satellite broadcast.

In the computer, by loading the removable recording medium 811 into the drive 810, the program can be installed into the storage unit 808 via the input/output interface 805. It is also possible to receive the program from a wired or wireless transfer medium using the communication unit 809 and install the program into the storage unit 416. As another alternative, the program can be installed in advance into the ROM 802 or the storage unit 808.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown therein but also a process executed in parallel or individually, not necessarily performed in time series.

Further, in this specification, "system" refers to a whole device composed of a plurality of devices.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the disclosure is not limited to the embodiments described above, and various changes and modifications may be made without departing from the scope of the disclosure.

An embodiment of the disclosure is not limited to the embodiments described above, and various changes and modifications may be made without departing from the scope of the disclosure.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

In the present specification, the examples in which the various pieces of information are multiplexed in the coding stream and are transmitted from the encoding side to the decoding side have been described. However, the methods of transmitting the information are not limited to the examples. For example, the information may be transmitted or recorded as separate pieces of data associated with the coding bit stream without being multiplexed in the coding bit stream. Here, the term "associated" means that an image (which may be a part of an image, such as a slice or a block) included in a bit stream and information corresponding to the image can be linked at the time of decoding. That is, the information may be transmitted along a different transmission path from the image (or the bit stream). The information may be recorded in a different recording medium (or a different recording area of the same recording medium) from the image (or the bit stream). Further, the information and the image (or the bit stream) may be mutually associated, for example, in any unit such as a plurality of frames, a single frame, or a pert of a frame.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the Present Technology May Also be Configured as Below.

(1)

A file generation device including:
a file generation unit configured to dispose, at a beginning of a file including a bit stream generated by encoding content in which an image is divided into a plurality of subsamples, subsample access information for acquiring arbitrary subsamples from among the plurality of subsamples, and thereby generate the file.

(2)

The file generation device according to (1), wherein the subsample access information is disposed after a segment index box and a subsegment index box at the beginning of the file.

(3)

The file generation device according to (1) or (2), wherein the subsample access information is index information and size information for all subsamples.

(4)

The file generation device according to any of (1) to (3), wherein
the subsample access information is disposed in a general subsegment index box.

(5)

The file generation device according to (1) or (2), wherein the subsample access information is offset information to a box storing information related to subsamples in a moof, and size information for the box.

(6)

The file generation device according to (1), (2), or (5), wherein
the subsample access information is disposed in a SubsampleBox LocationBox.

(7)

The file generation device according to any of (1) to (6), wherein
the subsamples are tiles.

(8)

The file generation device according to any of (1) to (7), further including:
an encoding unit that encodes the content in which an image is divided into a plurality of subsamples, and thereby generates the bit stream.

(9)

A file generation method including:
disposing, by a file generation device, at a beginning of a file including a bit stream generated by encoding content obtained by dividing an image into a plurality of subsamples, subsample access information for acquiring arbitrary subsamples from among the plurality of subsamples, and thereby generating the file.

(10)

A content playback device including:
an access information acquisition unit configured to acquire subsample access information from a file generated by disposing the subsample access information at a beginning of a file including a bit stream generated by decoding content in which an image is divided into a plurality of subsamples, the subsample access information being information for acquiring arbitrary subsamples from among the plurality of subsamples;
a sample acquisition unit configured to acquire the arbitrary subsamples using subsample access information acquired by the access information acquisition unit; and
a playback unit configured to play back arbitrary subsamples acquired by the sample acquisition unit.

(11)
The content playback device according to (10), wherein the subsample access information is disposed after a segment index box and a subsegment index box at the beginning of the file.

(12)
The content playback device according to (10) or (11), wherein
the subsample access information is index information and size information for all subsamples.

(13)
The content playback device according to any of (10) to (12), wherein
the subsample access information is disposed in a general subsegment index box.

(14)
The content playback device according to (10) or (11), wherein
the subsample access information is offset information to a box storing information related to subsamples in a moof, and size information for the box.

(15)
The content playback device according to (10), (11), or (14), wherein
the subsample access information is disposed in a SubsampleBox LocationBox.

(16)
The content playback device according to any of (10) to (15), wherein
the subsamples are tiles.

(17)
The content playback device according to any of (10) to (16), wherein
The content is stored on a server connected via a network.

(18)
A content playback method including:
by a content playback device,
acquiring subsample access information from a file generated by disposing the subsample access information at a beginning of a file including a bit stream generated by decoding content in which an image is divided into a plurality of subsamples, the subsample access information being information for acquiring arbitrary subsamples from among the plurality of subsamples;
acquiring the arbitrary subsamples using acquired subsample access information; and
playing back arbitrary acquired subsamples.

(19)
A file generation device including:
a file generation unit configured to generate a file composed of tracks which include tile information and which are associated with subsegments.

(20)
The file generation device according to (19), wherein
the tracks include tile samples.

(21)
The file generation device according to (19), wherein
the tracks include reference information for referencing tile samples.

(22)
A file generation method including:
by a file generation device,
generating a file composed of tracks which include tile information and which are associated with subsegments.

(23)
A content playback device including:
an access information acquisition unit configured to acquire access information to tiles from a file composed of tracks which include tile information and which are associated with subsegments;
a sample acquisition unit configured to acquire tile subsamples using the acquired access information to tiles; and
a playback unit configured to play back arbitrary acquired subsamples.

(24)
The content playback device according to (23), wherein
the tracks include tile samples.

(25)
The content playback device according to (23), wherein
the tracks include reference information for referencing tile samples.

(26)
A content playback method including:
by a content playback device,
acquiring access information to tiles from a file composed of tracks which include tile information and which are associated with subsegments;
acquiring tile subsamples using the acquired access information to tiles; and
playing back arbitrary acquired sabsamples.

REFERENCE SIGNS LIST 101 file generation device
102 content server
103 content playback device
104 network
111 storage unit
112 communication unit
121 streaming control unit
122 HTTP access unit
123 content playback unit
151 encoding unit
152 subsample information generation unit
153 MP4 file multiplexer
154 file transmission unit

The invention claimed is:

1. A file generation device, comprising:
a file generation unit configured to:
set, at a beginning of a file, subsample access information to access arbitrary subsamples from a plurality of subsamples, wherein the file comprises a bit stream generated based on an image that is divided into the plurality of subsamples, and wherein the subsample access information is set before a moof; and
generate the file based on the set subsample access information.

2. The file generation device according to claim 1, wherein
the subsample access information is set after a segment index box and a subsegment index box at the beginning of the file.

3. The file generation device according to claim 2, wherein
the subsample access information comprises index information and size information for each of the plurality of subsamples.

4. The file generation device according to claim 3, wherein the subsample access information is set in a general subsegment index box.

5. The file generation device according to claim 2, wherein
the subsample access information comprises offset information to a box that stores information related to subsamples in the moof, and size information for the box.

6. The file generation device according to claim 5, wherein the subsample access information is set in a SubsampleBox LocationBox.

7. The file generation device according to claim 1, wherein the subsamples are tiles.

8. The file generation device according to claim 1, further comprising
an encoding unit configured to:
encode content in which the image is divided into the plurality of subsamples; and
generate the bit stream based on the encoded content.

9. A file generation method, comprising:
setting by a file generation device, at a beginning of a file, subsample access information to access arbitrary subsamples from a plurality of subsamples, wherein the file comprises a bit stream generated based on an image that is divided into a plurality of subsamples, and wherein the subsample access information is set before a moof; and
generating the file based on the set subsample access information.

10. The file generation method according to claim 9, wherein
the subsample access information is set after a segment index box and a subsegment index box at the beginning of the file.

11. A content playback device, comprising:
an access information acquisition unit configured to access subsample access information from a first file generated based on the subsample access information that is set at a beginning of a second file, wherein the second file comprises a bit stream generated based on an image that is divided into a plurality of subsamples, wherein the subsample access information is set before a moof, and
wherein the subsample access information is information to access arbitrary subsamples from the plurality of subsamples;
a sample acquisition unit configured to access the arbitrary subsamples based on the subsample access information,
wherein the subsample access information is accessed by the access information acquisition unit; and
a playback unit configured to play back the accessed arbitrary subsamples.

12. The content playback device according to claim 11, wherein
the subsample access information is set after a segment index box and a subsegment index box at the beginning of the file.

13. The content playback device according to claim 12, wherein
the subsample access information comprises index information and size information for each of the plurality of subsamples.

14. The content playback device according to claim 13, wherein the subsample access information is set in a general subsegment index box.

15. The content playback device according to claim 12, wherein the subsample access information comprises offset information to a box that stores information related to subsamples in the moof, and size information for the box.

16. The content playback device according to claim 15, wherein the subsample access information is set in a SubsampleBox LocationBox.

17. The content playback device according to claim 11, wherein the subsamples are tiles.

18. The content playback device according to claim 11, wherein the content is stored on a server connected via a network.

19. A content playback method, comprising:
by a content playback device,
accessing subsample access information from a first file generated based on the subsample access information that is set at a beginning of a second file, wherein the second file comprises a bit stream generated based on an image that is divided into a plurality of subsamples, wherein the subsample access information is set before a moof, and
wherein the subsample access information is information to access arbitrary subsamples from the plurality of subsamples;
accessing the arbitrary subsamples based on the accessed subsample access information; and
playing back the accessed arbitrary subsamples.

20. The content playback method according to claim 19, wherein
the subsample access information is set after a segment index box and a subsegment index box at the beginning of the second file.

* * * * *